May 21, 1935.　　　　E. H. BARKER　　　　2,001,760
METHOD AND MACHINE FOR PROCESSING COLLAPSIBLE TUBES
Filed Aug. 31, 1931　　14 Sheets-Sheet 4
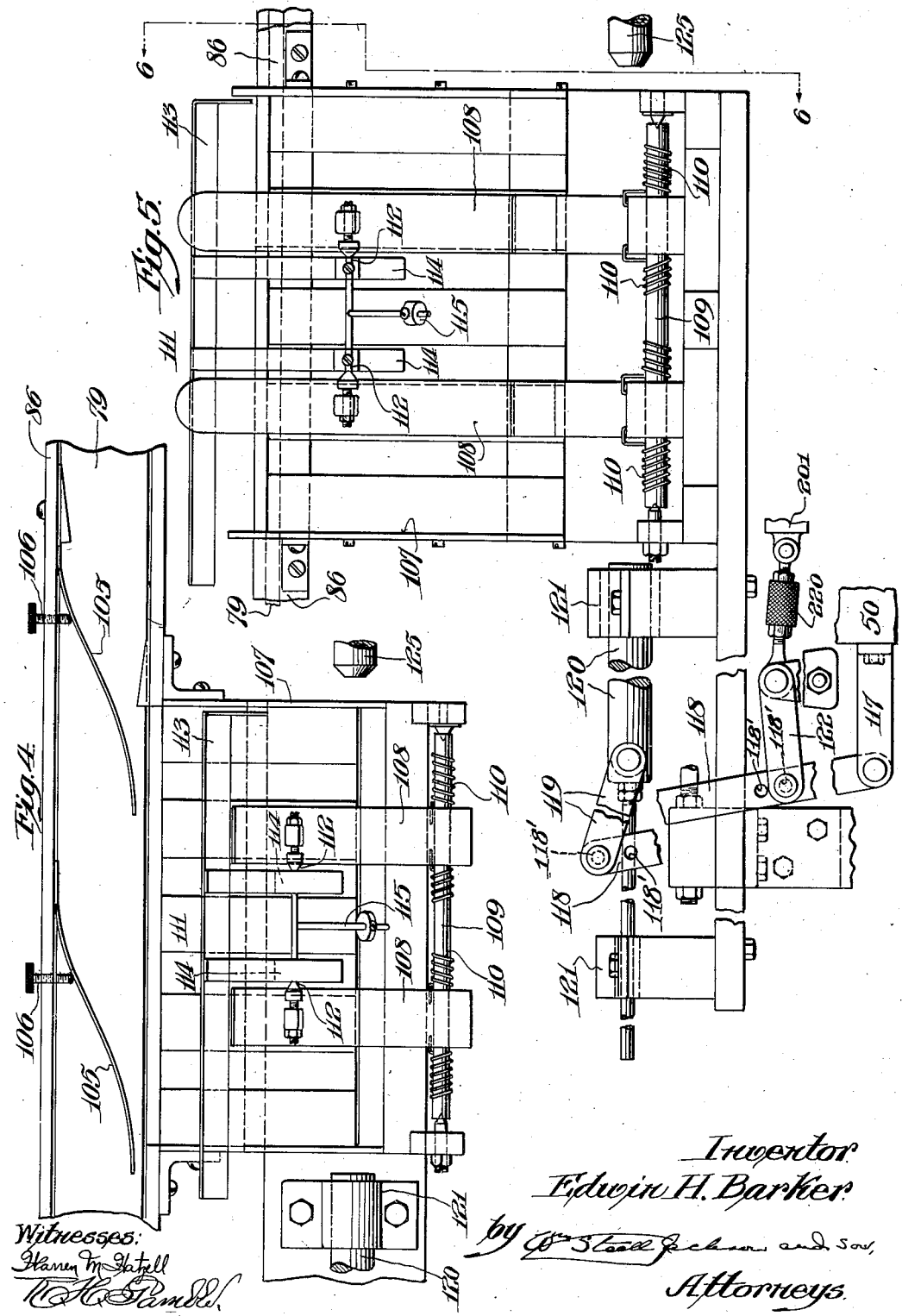

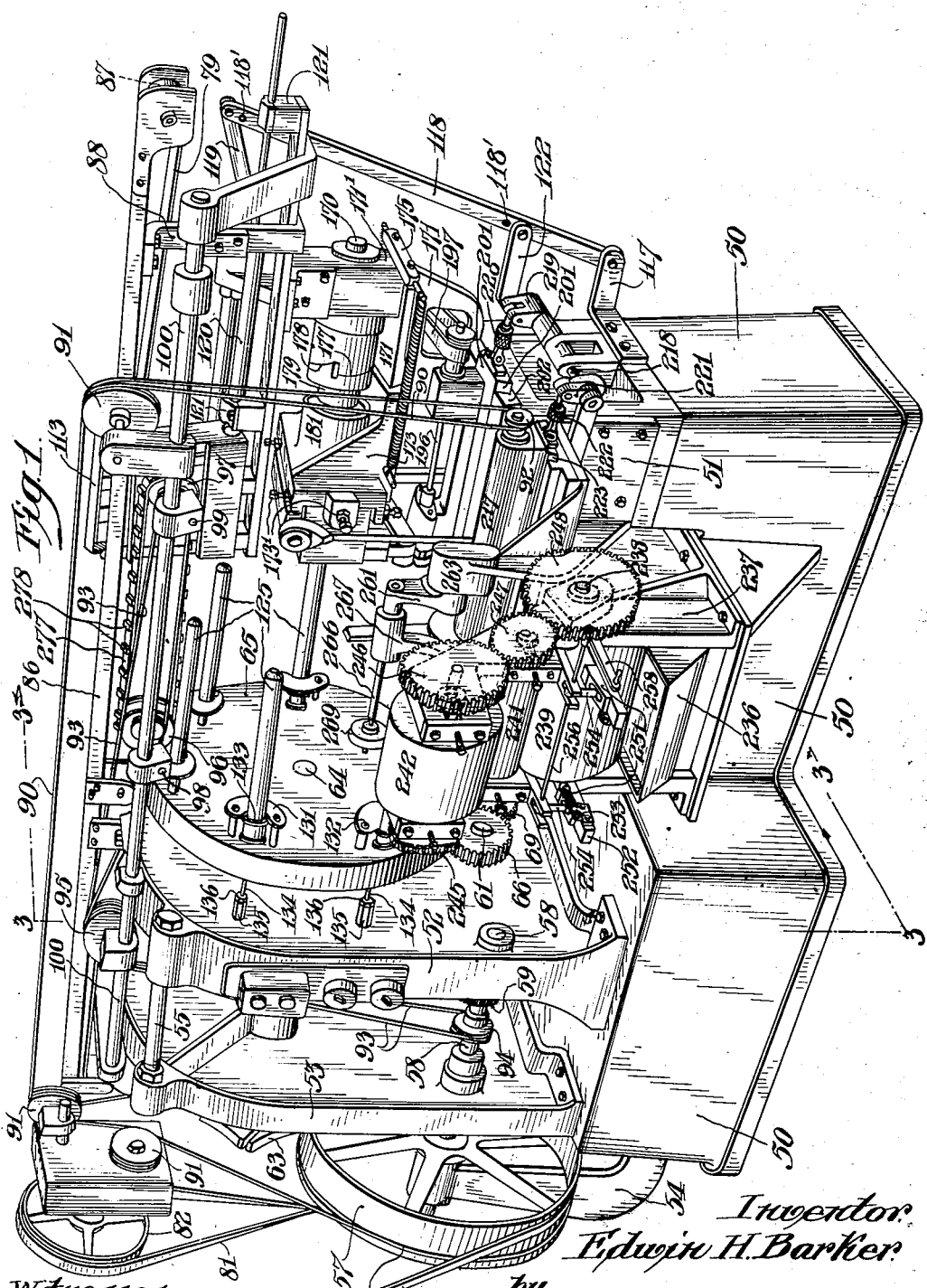

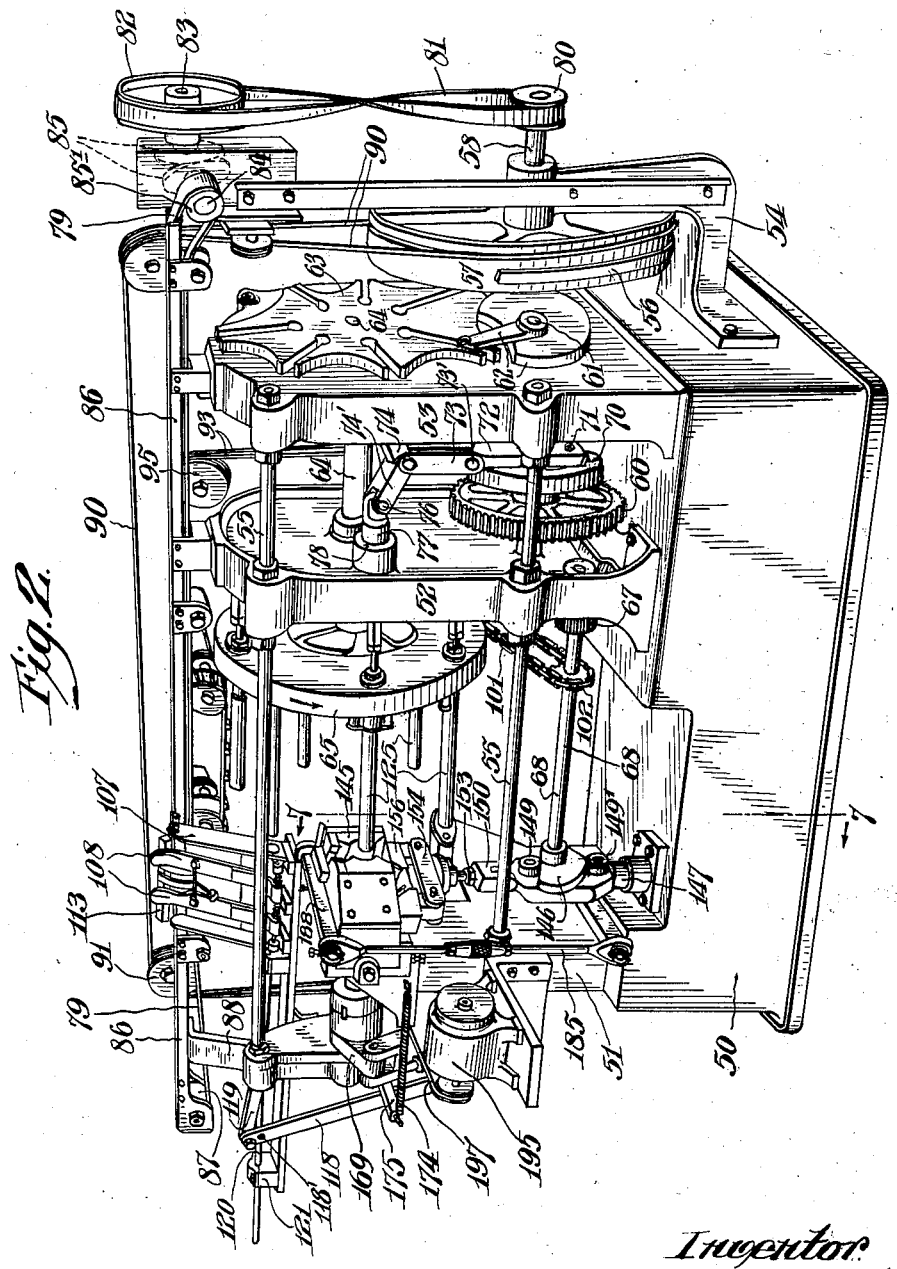

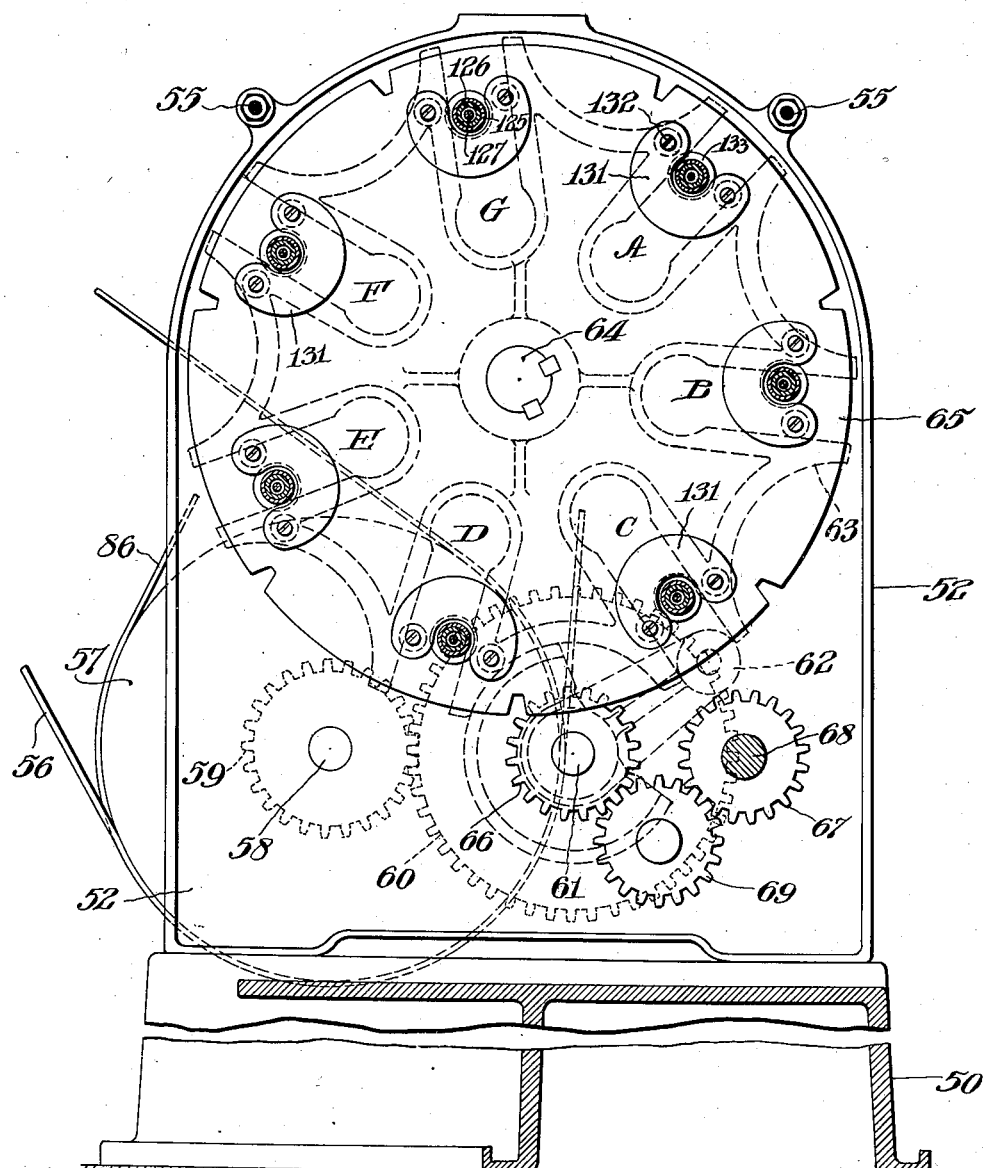

May 21, 1935. E. H. BARKER 2,001,760
METHOD AND MACHINE FOR PROCESSING COLLAPSIBLE TUBES
Filed Aug. 31, 1931 14 Sheets-Sheet 5
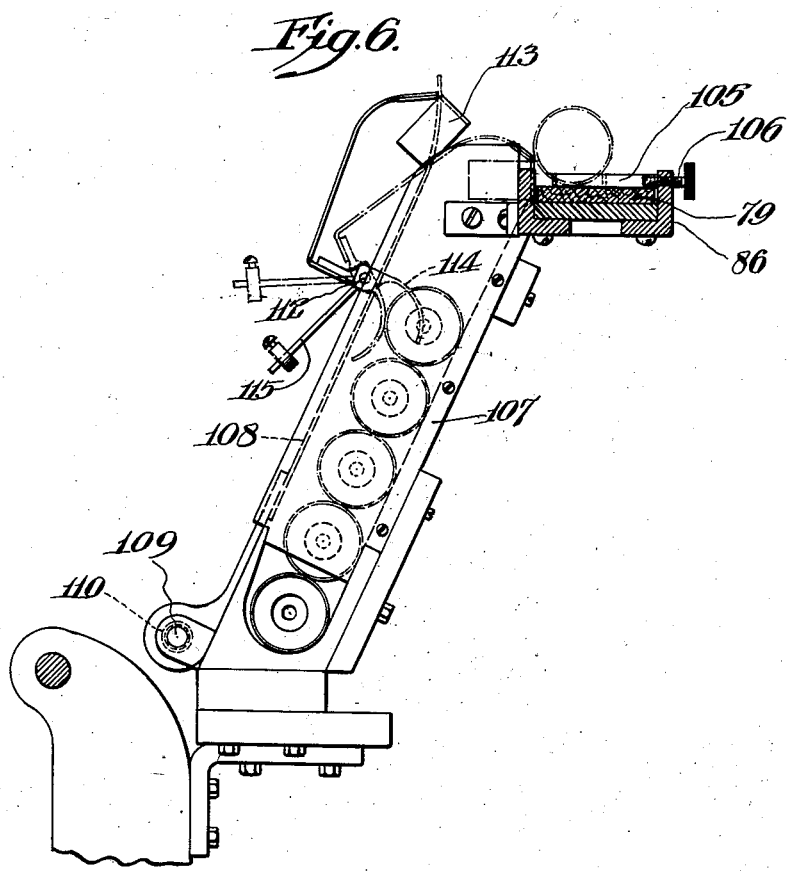

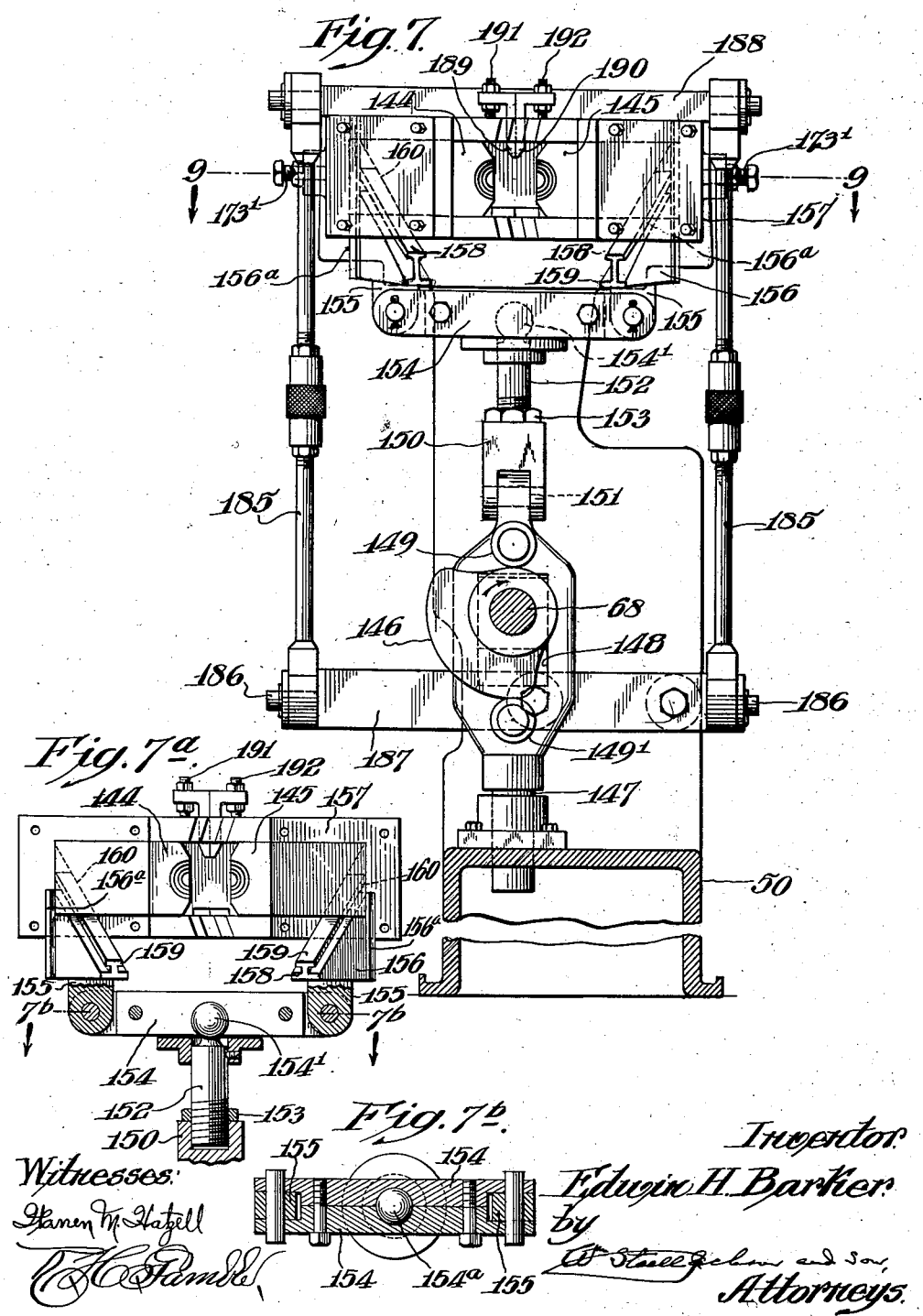

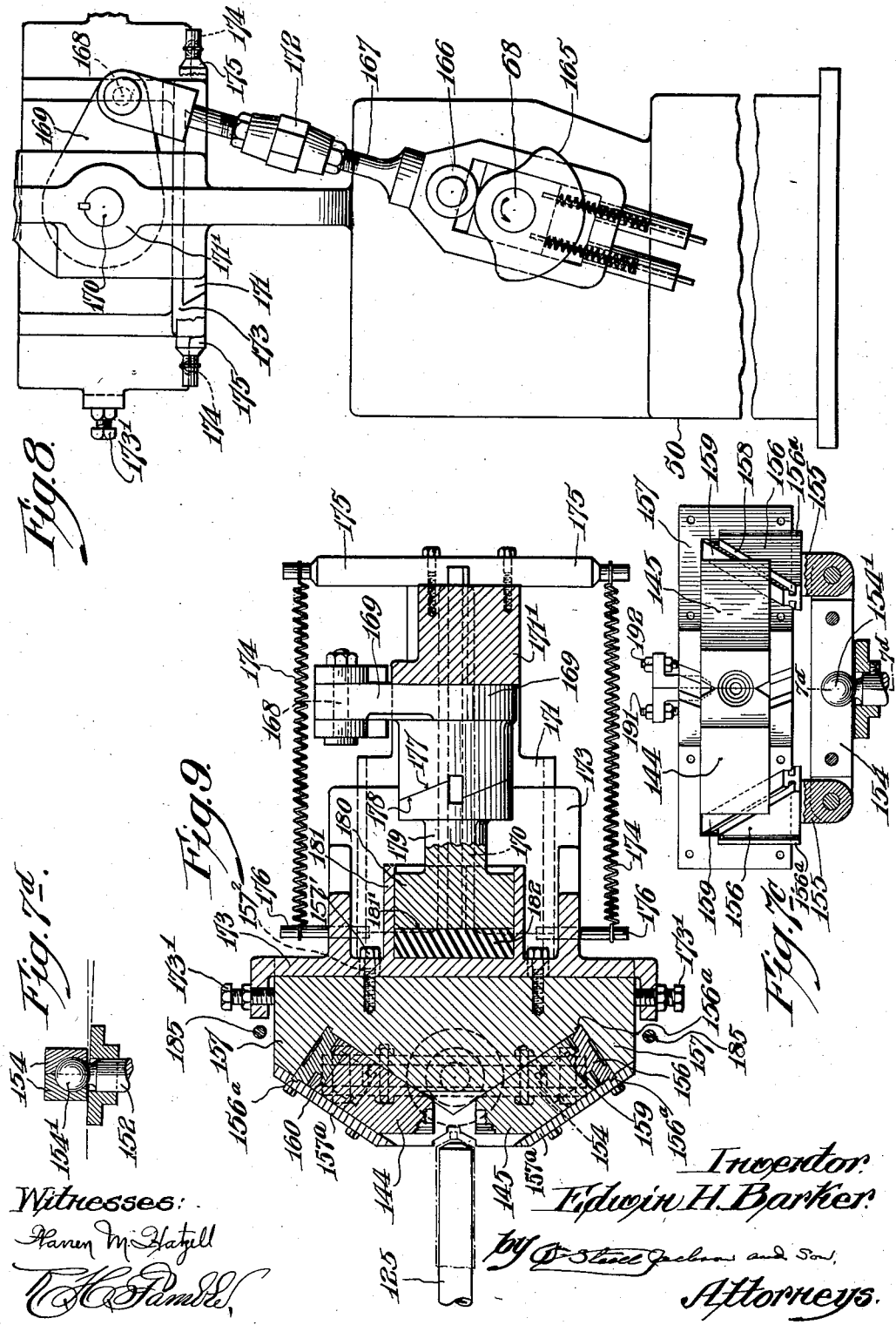

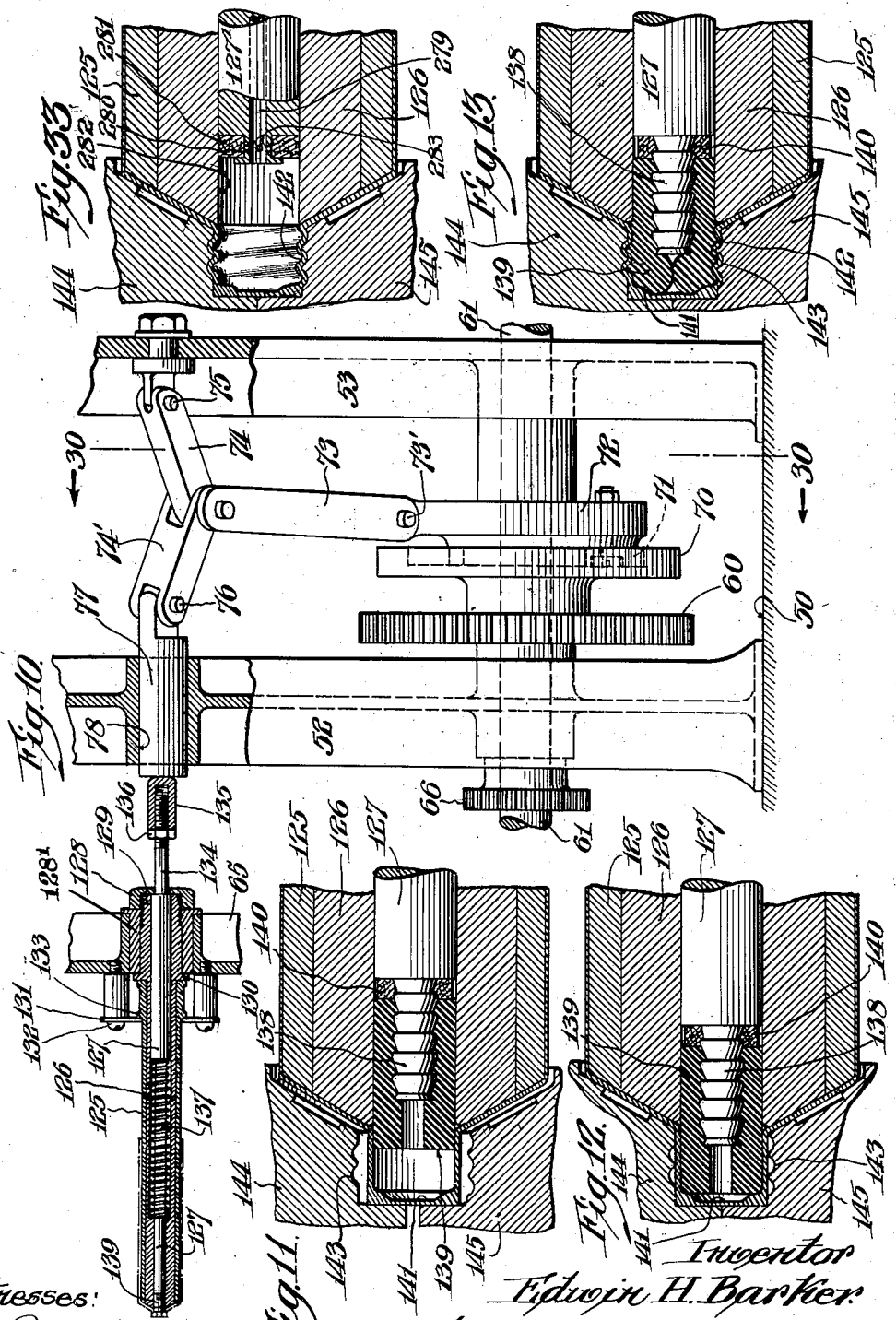

May 21, 1935.  E. H. BARKER  2,001,760
METHOD AND MACHINE FOR PROCESSING COLLAPSIBLE TUBES
Filed Aug. 31, 1931   14 Sheets-Sheet 9
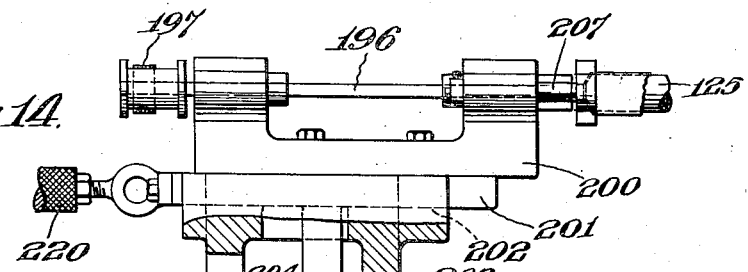
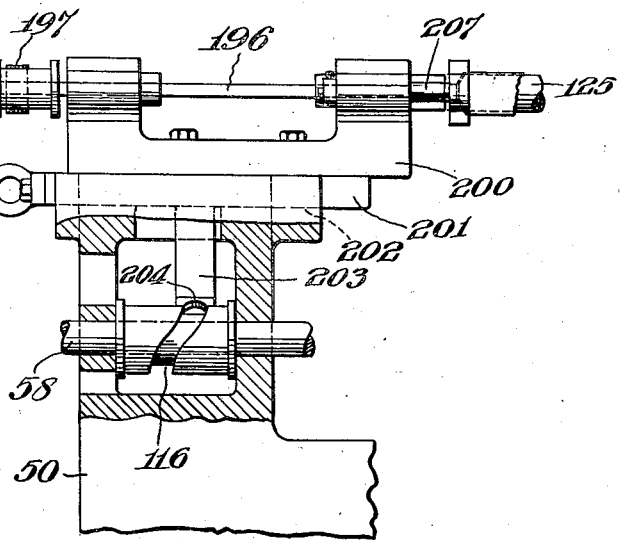
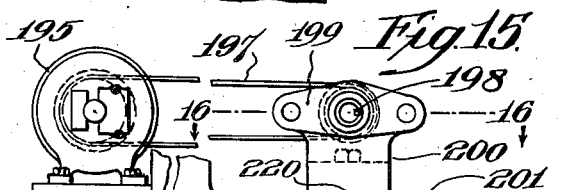
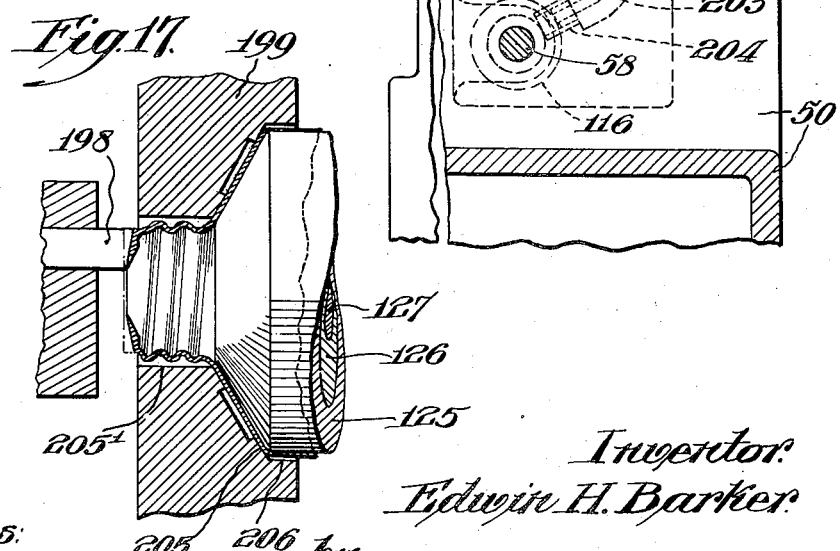
Inventor:
Edwin H. Barker
by
Attorneys
Witnesses:

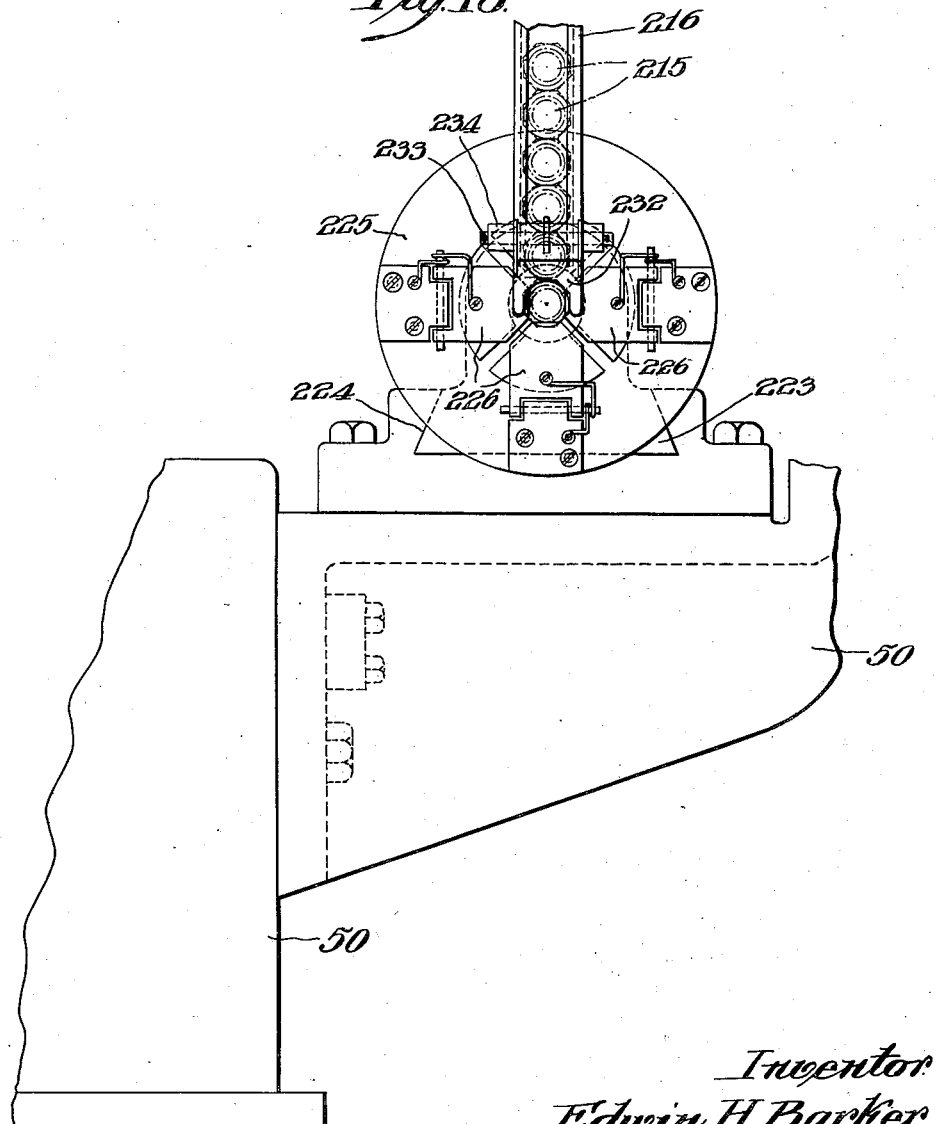

May 21, 1935. E. H. BARKER 2,001,760
METHOD AND MACHINE FOR PROCESSING COLLAPSIBLE TUBES
Filed Aug. 31, 1931 14 Sheets-Sheet 11
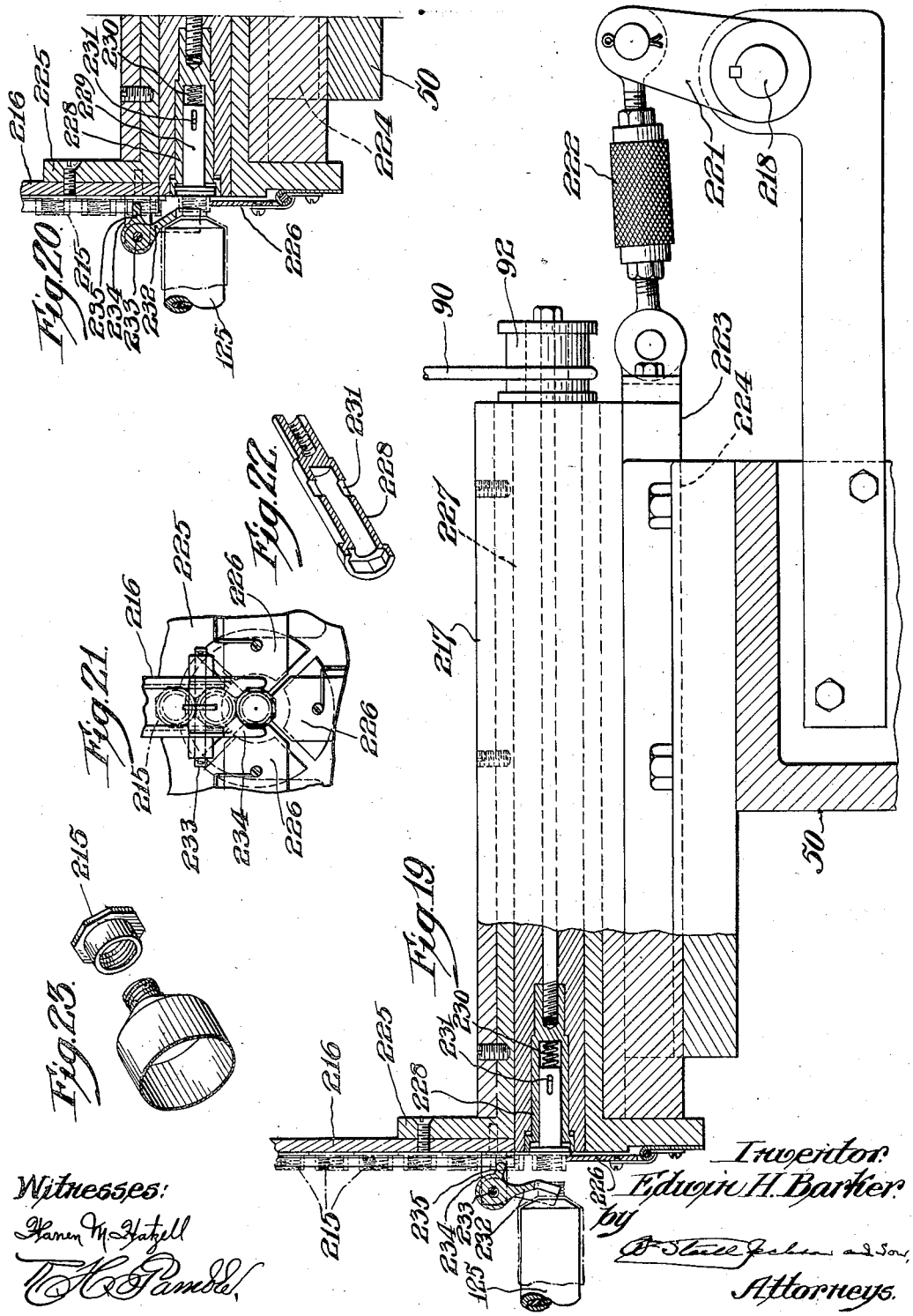

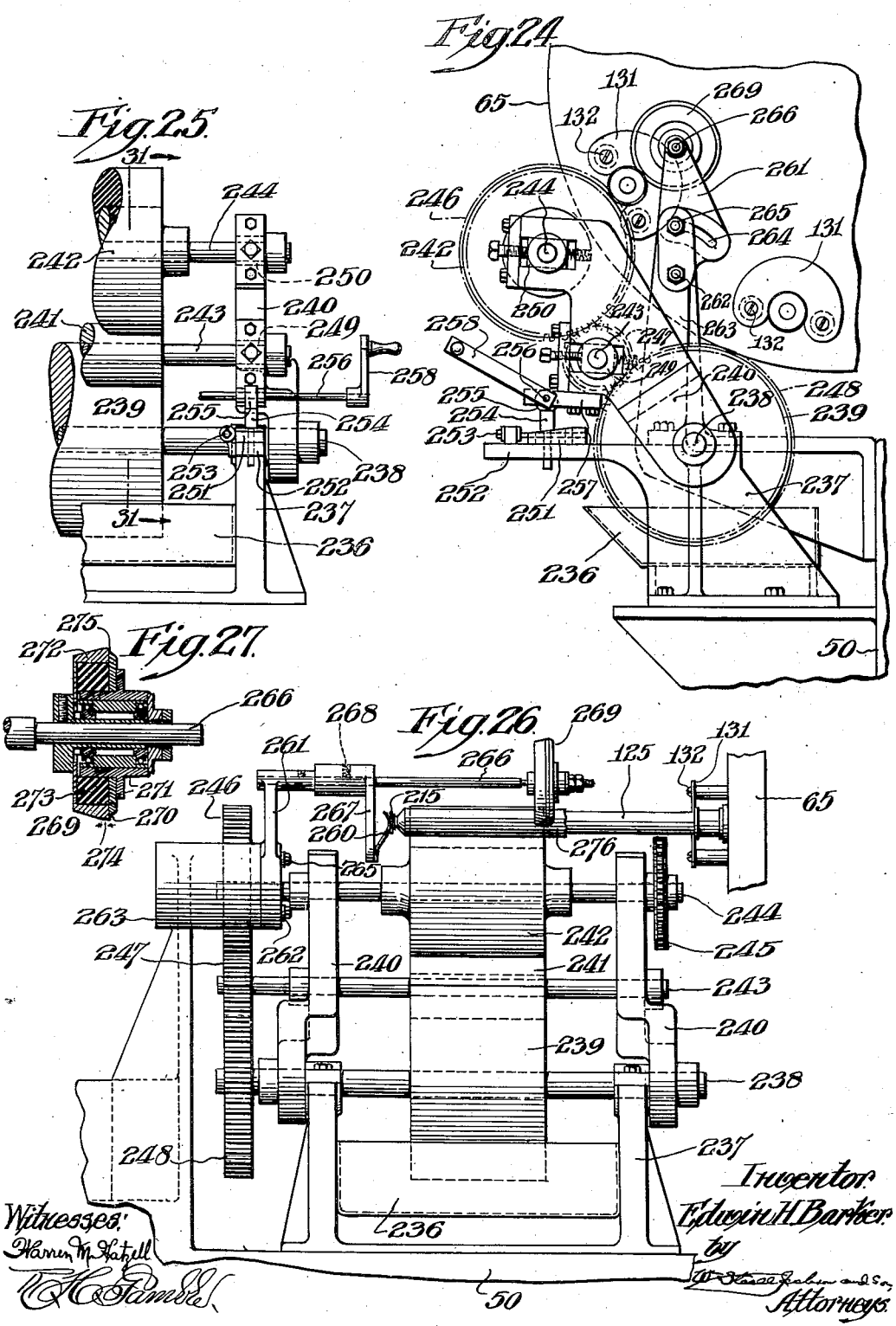

May 21, 1935. E. H. BARKER 2,001,760
METHOD AND MACHINE FOR PROCESSING COLLAPSIBLE TUBES
Filed Aug. 31, 1931 14 Sheets-Sheet 13
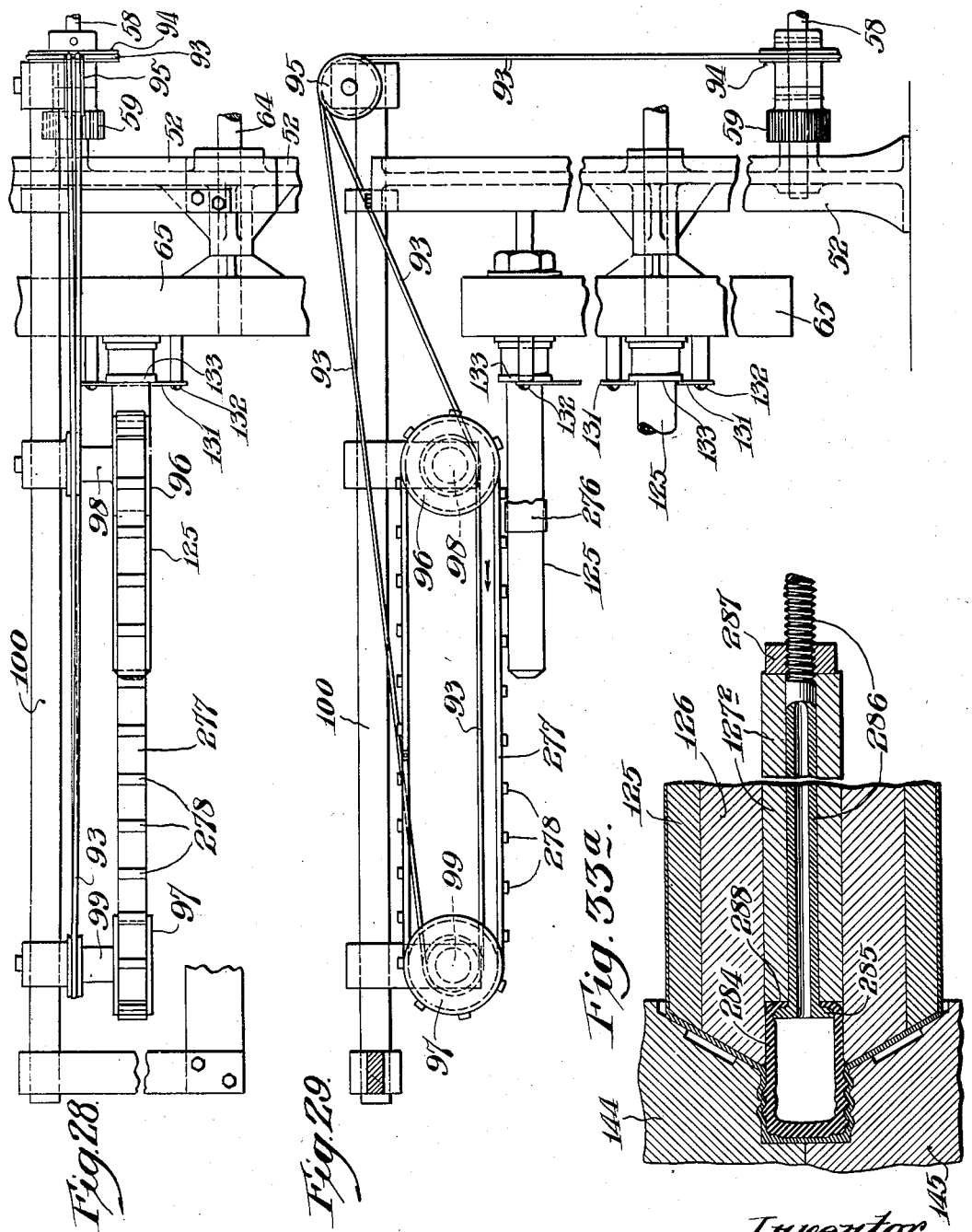

May 21, 1935.    E. H. BARKER    2,001,760
METHOD AND MACHINE FOR PROCESSING COLLAPSIBLE TUBES
Filed Aug. 31, 1931    14 Sheets-Sheet 14
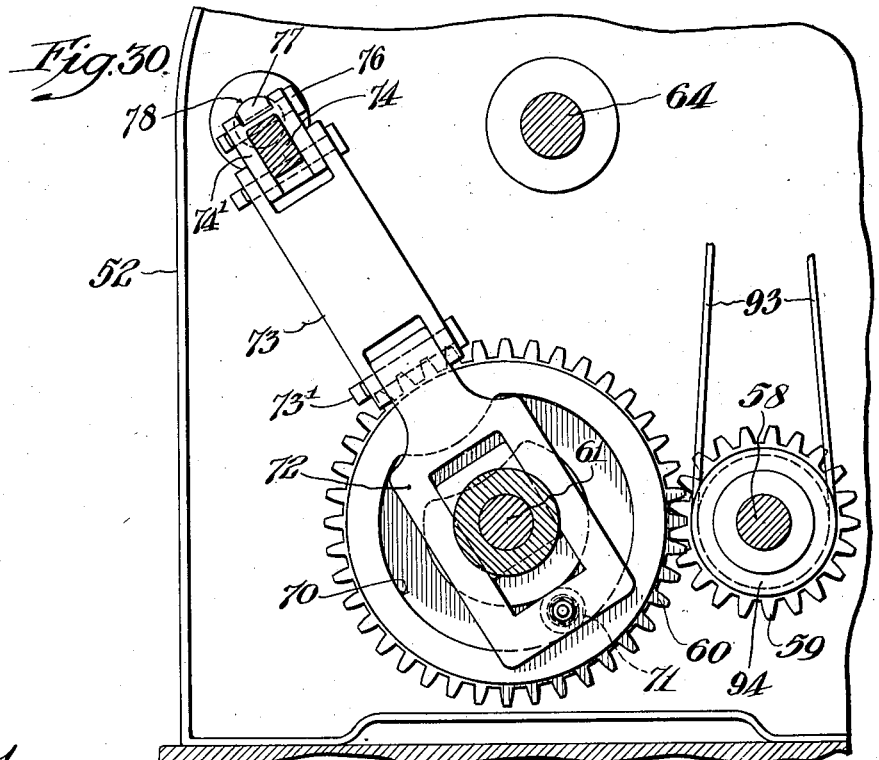
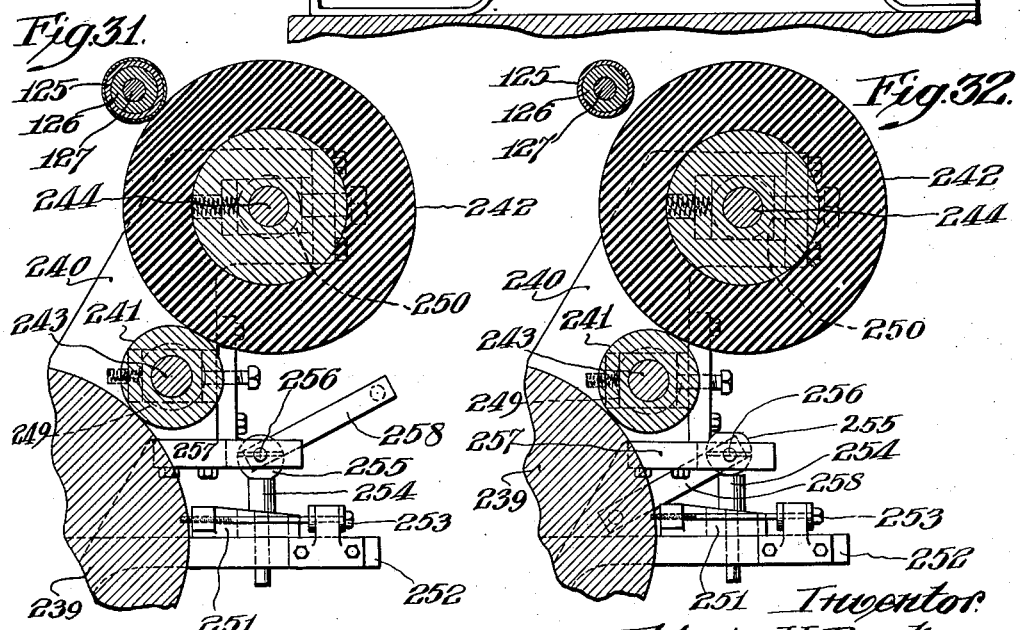
Witnesses:
Inventor
Edwin H. Barker
by Attorneys Patented May 21, 1935

2,001,760

UNITED STATES PATENT OFFICE 2,001,760

METHOD AND MACHINE FOR PROCESSING COLLAPSIBLE TUBES

Edwin H. Barker, Moylan, Pa., assignor to A. H. Wirz, Inc., Chester, Pa., a corporation of Pennsylvania Application August 31, 1931, Serial No. 560,408

20 Claims. (Cl. 113—44)

My invention relates to the manufacture of collapsible dispensing tubes, of the type commonly used in the dispensing of shaving creams, tooth pastes, salves, paints, etc.

One of the purposes of my invention is to convey tubes as made upon an extruding press, from the press to a finishing machine.

A further purpose is to automatically transfer tubes from the conveyor of an extrusion machine to a feed hopper and thence to a suitable spindle or mandrel.

One of the purposes of my invention is to perform the successive operations upon the tubes after extension through to the finishing operations with a single mounting.

A further purpose is to mount a multiple of spindles upon a rotatable head and to successively present the spindles to the point of transfer from the hopper and mechanically mount tubes upon them.

A further purpose is to force the metal of the tube nipple radially outward into a suitable thread die, to form the entire thread simultaneously, and to withdraw the forming means from the path of the threads prior to removing the collapsible tube.

A further purpose is to provide a straight tube nipple of extremely thin metal and to thread the nipple by pressure inserted substantially radially to press the metal into a thread within a die or form and subsequently to release the threading means and the die or form to permit the withdrawal of the tube nipple.

A further purpose is to mount a plurality of tubes upon a rotatable head having a definite cycle of operation, to progressively advance the tubes along the cycle, and to perform different operations of threading, cutting, capping and decoratively finishing several points of the cycle simultaneously.

A further purpose is to provide a separate nipple threading device for each tube spindle, to close a set of dies about the nipple end of a collapsible tube, to advance the threading devices successively through the tube spindle at a threading position, to force the metal radially outwardly into the dies, to withdraw the threading device, and to advance the threading spindle in turn by a driving mechanism common to all of them at threading position.

A further purpose is to cut the face or top end of a threaded nipple outlet upon a collapsible tube at a distance from the center and to a depth cutting into the hollow interior of the nipple.

A further purpose is to provide a hopper from which threaded caps are fed with their open end always presented in the direction of a collapsible tube nipple, and to advance the cap with a rotary movement in order to thread the cap upon the tube nipple.

A further purpose is to paint, ground coat or print the side walls of the tube while the tube is mounted upon a spindle of a rotatable head.

A further purpose is to trim or sever the waste from the open end of a collapsible tube, by rotating the tube against a cutter by frictional engagement with mechanism used to perform another operation.

A further purpose is to automatically clear or strip the waste cuttings from the open ends of the tubes from the mandrels or spindles at a position in advance of the mandrel receiving a new tube.

Further purposes will appear in the specification and in the claims.

The invention broadly comprehends the transfer of the tubes from the extrusion press to my present machine, the automatic feeding of the tube to the machine, the threading of the nipple, the severance of the material forming a closure at the end of the nipple, the feeding and placing of a threaded cap upon the opened nipple, the printing or coating of the body portion, the trimming of the waste end, the positioning for manual removal and the automatic removal of the waste ends which have been severed from the tube bodies. The sequence in which the above operations are mentioned is the rotation in which the cycle of operations take place, and this sequence will be followed in the description of parts and of the operation, in the specification which follows.

My invention comprises both the processes involved and apparatus by which these processes may be carried out.

In selecting the mechanism for illustration I have been guided not only by the requirements of the statute that I shall show the best form of my invention, but under the proviso have particularly selected that which is not only practical, efficient, rapid and reliable in operation, but that which best illustrates the processes involved.

Figure 1 is a front elevational perspective of the preferred form of my invention.

Figure 2 is a similar view of the machine taken from the rear.

Figure 3 is a sectional elevation taken on the line 3—3 of Figure 1, certain parts being omitted for clearness.

Figure 4 is a plan view of the tube feeding mechanism.

Figure 5 is a side elevation of the part shown in Figure 4.

Figure 6 is an end elevation partly in section corresponding to the line 6—6 of Figure 5.

Figure 7 is a view showing the die operating mechanism and corresponding to a sectional line taken from the line 7—7 of Figure 2.

Figure 7a is a view corresponding to a portion of Figure 7 showing the die opening and closing mechanism partly in section, and with cover plates removed.

Figure 7b is a sectional plan view taken on line 7b—7b of Figure 7a looking in the direction of the arrows.

Figure 7c is a view similar to Figure 7a showing the dies in the closed position.

Figure 7d is a fragmentary detail taken in the line 7d—7d of Figure 7c.

Figure 8 is an end elevation of mechanism for advancing the die carriage.

Figure 9 is a sectional plan view taken on the line 9—9 of Figure 7.

Figure 10 is a fragmentary elevation partly in section showing the mechanism for advancing the spindle within the mandrel.

Figures 11, 12 and 13 are fragmentary sectional details enlarged showing the development of the thread within the dies.

Figure 14 is a side elevation partly in section showing the nipple trimming mechanism.

Figure 15 is an end elevation of Figure 14.

Figure 16 is a sectional plan taken on the line 16—16 of Figure 15.

Figure 17 is an enlarged view of a tube nipple in contact with the cutting tool.

Figure 18 is an end elevation of the capping mechanism.

Figure 19 is a side elevation partly in section of the elements shown in Figure 18.

Figure 20 is a sectional side elevation corresponding to the left-hand end of Figure 19, and showing the several parts in a different position.

Figure 21 is a fragmentary front elevation of some of the elements seen in Figures 19 and 20.

Figure 22 is a sectional perspective of the capping socket.

Figure 23 is a perspective of the nipple end of a threaded tube and a cap in position to be advanced to the nipple for the purpose of threading thereon.

Figure 24 is an end elevation of the coating and trimming mechanism.

Figure 25 is a partial side elevation of the structure of Figure 24.

Figure 26 is a side elevation of the structure of Figure 24 as viewed from the opposite direction from the view shown in Figure 25.

Figure 27 is a sectional detail of the waste trimmer.

Figure 28 is a plan view of the stripping mechanisms for removal of the waste ends of the tubes.

Figure 29 is a side elevation of the parts shown in Figure 28.

Figure 30 is an elevation of the operating mechanism for advancing the spindle within the mandrel, and corresponds to a section taken on line 30—30 of Figure 10.

Figure 31 is an enlarged fragmentary section, taken on the line 31—31 of Figure 25, looking in the direction of the arrows.

Figure 32 is a view similar to Figure 31, and showing the several parts in another position.

Figures 33 and 33a are sectional details similar to Figures 11, 12 and 13 illustrating other arrangements for the fluid expansion of the threads upon the nipple of a tube.

In the drawings similar numerals indicate like parts.

The collapsible metal tubes illustrated have the front of the tube formed with a thin slope breast terminating in a threaded nipple surmounted by a cap which closes the discharge opening.

Prior to my inventions the threads upon the nipples of these tubes have been formed by external cutting or rolling of the thread within a thick nipple.

In my patent, No. 1,733,712, dated October 29, 1929, for Dispensing tube, the threads were rolled in a very thin nipple wall from the inside, outwardly and into suitably formed split dies. They were rolled by the advance and withdrawal of a rotatable tool, which followed the pitch and contour of the thread. This method decreased the cost of manufacture considerably due to the amount of metal saved in the construction of the side wall of the nipple, but there were present therein two slight objections. One the length of time required to advance and withdraw the tool in its revolving path, and the other the extreme accuracy required in the adjustment in order to roll a thread of absolute even thickness throughout its length.

In my present invention, the method of forming the threads is similar to that set forth in a copending application, for Process and machine for working metal, Serial Number 505,892, filed December 31, 1930, wherein pressure is applied to the inner wall of the nipple forcing it outwardly into a split die which carries the outer thread formation desired. In the copending application I have shown only the formation of the threads within the nipple, while in my present application I include a full range of operations upon a tube from the time it leaves the extrusion press until it is completed and ready to receive its content.

In order that my invention may be clearly understood I will describe one embodiment of it in full, including its setting, as follows:—

The frame

The frame is seen best in full in Figures 1 and 2, and in section in Figure 3, and as shown comprises a bed 50 carrying a plurality of vertical supporting elements 51, 52, 53 including an outboard bearing bracket 54.

The vertical supporting elements are fastened to the bed and are stiffened above the base by horizontal tie rods 55, which assist in maintaining the supports in correct vertical alignment and in preventing vibration. The structure will vary with the design and relation of the parts carried by the bed and the supporting elements.

The driving connections and power distribution

Referring now to Figures 1, 2 and 3, the power is shown as applied by a belt 56 to a driving pulley 57 mounted upon the outer end of a short-shaft 58 suitably positioned and supported by the vertical supports 52 and 53. Mounted upon the shaft 58 near the vertical supporting frame member 52 is a gear 59 which meshes with and drives a gear 60, fixed upon a shaft 61. The shaft 61 is also a short shaft corresponding in length to the shaft 58 and likewise finds bearing in the vertical supports 52 and 53. The outer end of this second short-shaft 61 carries the driving element 62 of a Geneva motion 63, which is in turn mounted upon a shaft 64. The inner end of the shaft 64 carries a dial head 65 which is intermittently rotated with the Geneva motion 63.

Mounted upon the shaft 61 on the inner side of the vertical support 52, is a gear wheel 66 which drives a gear 67 mounted upon a shaft 68, through an intermediate idler gear 69. The shaft 68 is a cam shaft and it controls the operation of the dies of the nipple-threading mechanism, the feeding of the tubes upon the mandrels, the capping mechanism, the nipple trimming mechanism, the coating devices and the tube end trimming cutters, all hereinafter referred to.

Mounted upon the short-shaft 61 between the supporting elements 52 and 53 and adjoining the gear 60, is an internal cam 70 (Figures 10 and 30) in which ride a pin and roller 71 carried by yoke 72. The yoke is guided by and straddles the shaft. The yoke is hinged at 73' to a link 73 which in turn is hinged to toggle arms 74, 74'. Arm 74 turns about a fixed supporting pin at 75 and arm 74' is pivoted at 76 to a plunger 77 guided at 78 within the supporting element 52.

The plunger 77 is located in line with the tube-threading mechanism and its movement in one direction furnishes the power stroke for the extruding of the thread on the nipple, and in the opposite direction permits the withdrawal of this same mechanism and the release (resilient retraction) of the extruding means.

In conveying the tubes as extruded from the press to my present machine, I employ an endless belt 79, (best shown in Figure 2) which in the present instance, is shown driven from an auxiliary pulley 80 mounted upon an extension of the short-shaft 58.

A driving belt 81 is interposed between the pulley 80 and a pulley 82 which is rigid with short-shaft 83. The short-shaft drives a shaft 84 at right angles to it through suitable reduction or speed change gears 85. Mounted on the free end of the right angle shaft 84 is a pulley 85' over which the endless belt 79 passes and from which it is directly driven. Each of the shafts is mounted in appropriate bearings.

The upper run of the endless belt 79 is guided in a channel 86 which runs the full length of the machine and carries an idler pulley 87 at its far end for the endless belt to pass over and return. The channel is supported by the vertical members 52 and 53, and by a bracket 88 at the far end of the machine. The lower stretch of the belt is supported at several points by idler pulleys 89.

This belt feed is of course extended to the press from which the tubes are extruded. The driving means here illustrated and the extension of the belt are conventional and it has not been considered necessary to illustrate loading means from the press.

Rotary motion for the application of the caps to the threaded nipples is furnished by an endless belt 90 (Figure 2) driven by the main drive pulley 57. For convenience in transmission from one end of the machine to the other, belt 90 passes over a series of suitably arranged idler pulleys 91 and about driven pulley 92 attached to one end of the capping mechanism.

Motion for the operation of stripping the waste cuttings of the tubes from the mandrels, is furnished by an endless belt 93 (Figures 1, 28 and 29) driven by a pulley 94 mounted upon the short-shaft 58.

This belt passes over a pair of suitable idler pulleys 95 and engage a pair of (to them) driven pulleys 96 and 97 which are carried on short-shafts 98 and 99 mounted in brackets carried by a supporting rod 100 running the entire length of the machine.

The coating mechanism (Figure 2) is driven by a sprocket chain 101 which passes over a sprocket 102 mounted on the cam shaft 68.

Thus far the apparatus described pertains to the driving, and is all located at the driving end of the machine as distinguished from the operation end. Considering next application of the driving power to mechanism moving and operating upon the tubes and dial-carried parts, the rest of the structure will be described from the dial standpoint. Starting with the loading position of the tubes upon the dial and progressing through the cycle before mentioned, all of these movements take place at the operating end of the machine, i. e., that portion of the machine including the dial head and all mechanism to the right of the dial as viewed from the operator's side illustrated in Figure 1.

*The dial head*

The dial head is illustrated as carrying a plurality of tube-loading spindles, here shown as seven in number, through the accident of this being the number which was found most convenient for the designed speed to match available convenient speeds of loading and unloading by a single operator.

With the number of stop positions desired to carry out the several operations outlined, seven positions gave the operator sufficient room for convenient unloading and at the same time gave sufficient stop positions for the remaining operations.

The spindles comprising the tube-carrying elements are the same for all of the seven dial stations shown and their detailed construction is shown in section in Figure 10. As hereinbefore mentioned, they are successively and intermittently presented to the various points of operation, this movement being accomplished by the intermittent rotation of the Geneva motion 63.

Within the path of travel of the tubes carried by belt 79 I provide a pair of flat springs 105 having tension adjusting screws 106 adjustably mounted within the channel frame 86 and bearing against the rear side of the springs. (See Figures 1, 2, 4, 5 and 6). These springs 105 are located adjacent a hopper 107 which is fastened to one side of the channel 86 and as the tubes are carried into line with the top of this hopper, they are cammed off the endless belt 79 and into the hopper, dropping to a lowermost position within the hopper, which is the position in which the tubes are fed to mandrels carried by the rotatable dial head 65.

This hopper 107 is adapted to contain a plurality of tubes, each lying in a horizontal position, one above the other, and having their open ends (i. e., the ends opposite to the nipples) in a direction toward the mandrels upon the dial. The front of the hopper is made in the form of a spring gate, and consists of two or more plates 108 pivotally mounted upon a shaft 109 and spring pressed to closure by coil springs 110. Any imperfection occurring in a tube can be readily seen by the operator while the tube lies within the hopper, and the gate can be opened against the action of the spring and the tube can be removed before the tube leaves the hopper for the next step in the operation.

I further provide a safety device 111 (Figures 4 and 5) which prevents the hopper from over-loading. This device is pivotally mounted upon the gate 108 as at 112 and consists of a counterbalanced stop 113 which is moved to closure by the tubes themselves engaging a finger 114 which is formed by the continuation of a pair of supporting arms that support the stop 113, and is normally held open by the weighted arm 115 counterbalancing the entire weight of the safety device. When this device is in the normal or raised position as illustrated in full lines in Figure 6, tubes travelling along the endless belt 79 will be cammed into the hopper by the action of the flat springs 105, but when a predetermined number of tubes is present within the hopper, the uppermost tube presses against the finger 114 causing the safety device to close, as shown in the dot and dash position of Figure 6.

When the safety device is in this closed position, tubes being carried along the endless belt 79 are prevented from being cammed into the hopper 107. The flexible springs 105 lying in the path of the tubes are pushed aside by the action of the tubes themselves, and the tubes are carried on to a remote location by the endless belt 79. It will be noted that the springs 105 are very delicate and must be nicely adjusted by the adjusting screws 106 in order to function properly.

Tube feeding to mandrels

The next step in the cycle is to feed the tubes upon the spindles, upon which they are successively and intermittently presented and supported at the several stations for the various operations necessary to complete the tube. This feed takes place at the station "A", Figure 3.

Rotatably fixed to the cam shaft 58 is a spirally grooved cam 116 (Figure 14) that imparts a reciprocatory movement to the nipple facing and closure severing mechanism and which takes place at the third point of operation or at station "C". This reciprocatory movement also furnished the motion for the feeding of the tubes from the hopper 107 to mandrels mounted upon the dial 65, and is so timed as to feed during the rest period of the dial.

Pivotally mounted upon a bracket 117 (Figure 5) fixed to the bed 50 is a lever 118. The upper end of the lever has a link 119 pivotally connected to it, and the opposite end of the link is attached to a plunger 120 which is guided in a horizontal path by bearings 121 attached to the fixed framework of the machine. A second link 122 is interposed between the reciprocatory moving parts of the nipple-facing mechanism under control of the spiral grooved cam 116 and the lower end of lever 118, and any movement of the grooved cam causes the plunger 120 to move horizontally within the bearings 121, through the lever and link connections just described. These bearings are so located as to guide the plunger 120 in the same axial plane as that occupied by the lowermost tube within the hopper 107, and the plunger engages the tube in its forward movement (i. e., toward the dial head) and pushes the tube out of the hopper and on to a mandrel aligned therewith. (See Figures 4 and 5).

As the plunger 120 is withdrawn from beneath the tubes within the hopper 107 the tubes within the hopper drop by gravity, leaving the lowermost tube in the path of the plunger ready to be pushed forward onto the mandrel next presented.

Adjustment of the length of throw caused by movement of the links 119 and 122 is obtained by providing apertures 118' in the lever arm 118. The connecting pins can be inserted in different ones of these apertures to obtain the required adjustment.

Nipple threading

The tube upon the spindle is now moved one station, or to station B as indicated in Figure 3, by the rotation of the Geneva motion 63. At this station the threading of the nipple takes place, and is accomplished in the following manner.

The spindles comprising the tube-carrying elements are the same for all of the seven dial stations shown, and detailed construction of one of the spindles is clearly illustrated in section in Figure 10. Each comprises a hollow mandrel 125 carried upon a sleeve member 126 fixed within an opening in the dial head 65, and itself forming a guide for a shaft 127. The sleeve member 126 is held fixedly to the dial by a nut 128 upon the threaded end 129 of the sleeve member, the nut 128 tightening against the flange of a bushing 128' within the opening in the dial head, which in turn has a bearing against the back of the dial, and drawing a flange 130 against the face of the bushing. The bushing may be an integral part of the dial head.

A retaining plate 131 partially surrounds the hollow mandrel 125 at the face of the dial and is secured to the dial by any suitable means as screws 132. This plate bears against a shoulder 133 upon the hollow mandrel 125 and prevents its longitudinal displacement axially of the shaft 127.

The mandrel 125 affords the actual mount upon which the individual tubes are mounted and will have a diameter of the tube which is being treated. This permits the same machine to handle tubes of varying diameters upon the mandrels 125, by the interchanging of mandrels having diameters corresponding to the diameters of the tubes.

The shaft 127 has an extension 134 passing through the tightening nut 128 and carrying upon its free end and in threaded engagement therewith a ferrule 135. This ferrule can be adjusted longitudinally of the shaft axis and maintained in a set position by means of a lock nut 136.

As described under the heading of power distribution, an internal cam 71 operates the plunger 77 of a toggle motion, and the plunger reciprocates in line with the tube-threading mechanism. (See Figure 10). As the plunger 77 is advanced by the action of the toggle, it bears against the ferrule 135 on the extension of the shaft 127 and forces it toward the open or free end of the mandrel 125. With the breaking of the toggle, the shaft 127 is forced back and is maintained in contact with the plunger 77, by the action of a spring 137 bearing against a shoulder on the shaft 127 within the sleeve 126.

Referring now to Figures 10, 11, 12 and 13, the end of the shaft 127 nearest the operation end of the machine is reduced in diameter and serrated at 138 in order that it may receive and hold a section 139 of gutta-percha tubing, rubber or the like.

Interposed between the tubing 133 and the end of the shaft proper, I interpose a washer 140 of leather or similar material to prevent the gutta-percha from sticking to the metal when it is desired to replace a worn section of tubing with a new one.

When the toggle is in its completely opened or released position (Figures 10 and 11) the shaft 127 and tubing 139 are located within the sleeve 126, the mandrel 125, and the tube nipple in some such position as is shown in Figure 11.

As the toggle is closed and plunger 77 (and shaft 127) are forced forward, the parts first move to some such positions as are illustrated in Figure 12. With the final straightening out of the toggle arms, the shaft 125 is advanced still further resulting in compressing the tubing against the closed end 141 of the nipple and then, by reaction, swelling it outwardly against the interior walls 142 of the nipple to force the nipple wall into the interior thread 143 of the surrounding threading clamp jaws 144, 145 of the split die previously mentioned.

*Operation of the forming dies*

The split threading jaws are brought into position to surround the outside of the nipple just before pressure is exerted from the inside. The closing and opening of these split jaws thus cooperate with the advancement and withdrawal of the shaft 127 and its position relative to the shaft and tube positions are also shown in detail in Figures 11, 12 and 13. The open position of the dies is seen in Figures 7 and 9.

Referring now to Figure 7, cam 146, mounted on the main cam shaft 68, imparts a vertical reciprocating motion to a plunger 147 guided at 148. The plunger straddles the cam shaft 68, giving opportunity for additional lateral support by the shaft, and carries a pair of spaced rollers 149, 149' which lie on opposite sides of the cam and bear constantly upon the working face of the cam 146.

The plunger 147 has an upper extension 150 pivotally connected to it as at 151, and the extension is threaded to a shaft 152. Locking nut 153 mounted upon this thread makes it possible to lock the shaft in various positions of adjustment. The threaded shaft 152 connects with a horizontal cross head 154, and each outer end of the cross head has pivoted to it an arm 155 which is rigid with a shoe 156. These two shoes have a slide and groove connection at 156a with a head 157 which supports the split jaws 144, 145. Removable return portions 157a of the head 157 cooperate by their interior guide construction with the main portion of the head to provide guideway walls for the diagonally movable cooperating dies 144 and 145 (Figures 9 and 7).

Of course the simplest and cheapest and in some ways the best way to move the shoes (which carry the thread dies) is to move them directly toward and away from each other in planes perpendicular to the axis of the tube.

This, however, has some slight disadvantages in that the angle to the breast of the tube is small and there would be some drag upon the surface of its shoulder. This offers objection where the breast of the tube is embossed, making it desirable to have the movement of the dies more nearly perpendicular to the face of the breast of the tube. I find it desirable not only to back the shoes off from the breast of the tube diagonally with respect to the surface of its shoulder and therefore diagonally to the axis of the tube in that direction, but to withdraw the dies also diagonally with respect to the plane through the axis of the tube and through the center of the dies when they are in closed position.

For the above purpose I provide diagonal paths having side supporting surfaces to receive, support and guide the lateral sides of the shoes considered as blocks and having guiding, advancing and retracting diagonal rear surfaces by which the shoes are moved diagonally between the guiding sides.

In order to understand the paths of movement of the thread forming dies it is desirable to explain first the reasons for the peculiarities of the forming dies and the movements which they and, therefore, their supporting shoes must have.

The dies are divided in halves and therefore meet in what will be called for convenience the plane of the axis of the tube, notwithstanding that there are, of course an unlimited number of such planes.

Because of the steep slope of the breast of the tube and the fact that a large portion of the tube has lettering or decoration projecting from this surface it is desirable to have the dies move away from the breast of the tube as nearly in a right-angular direction thereto as possible, so that the breast of the tube can be supported close up to the decorated annulus as possible without scraping against the edges of the decoration during withdrawal of the dies. The slope of the breast is approximately 60 degrees to the axis of the tube and the most desirable angle for die movement from this standpoint is therefore 30 degrees to the axis of the tube.

Giving the dies any appreciable diagonal movement within planes parallel to the "plane of the tube axis" immediately complicates withdrawal of the innermost portions of the threads of the dies from the completed thread as they will then be drawn across the thread. I have taken care of this by giving a coincident movement to the dies laterally diagonally to and departing from the "plane of the tube axis".

With these two objects in mind, of having sufficient departure laterally from the breast of the tube to avoid interference with the decoration of the breast of the tube, and of having sufficient departure laterally from the plane of the tube axis to relieve from interference with the thread I have provided a die (therefore a shoe) movement which is composite of these two movements and which I find to be most easily secured by movement along a track, which track has what might be termed a composite diagonal position, and laterally supporting the shoes correspondingly.

One face 158 of each of the shoes 156 has a T head 159 which fits within a slot 160 of corresponding shape in the jaws 144, 145 (see Figures 2, 7 and 9). The T heads 159 of the shoes 156 and the cooperating slots in the jaws in which the T heads slide to move the jaws slope, the angles converging diagonally downward whereby the dies move simultaneously toward and along the axis of the mandrel 125 (Figure 9). Any upward movement of the cross head 154 causes the T heads to move upwardly within the angularly disposed slots 160 and forces the two sections of the split jaws 144—145 toward one another until they close about the nipple of the tube.

The advancement and withdrawal of the dies toward and from the nipple are also in angular planes (Figure 9), as I have found their withdrawal from the thread after forming them leaves the thread convolutions more easily than a withdrawing movement at right angles to the nipple.

Due to the fact that the lengths of the nipples and the thicknesses of the walls of the breast of the tubes vary in size as they come from the extruding press, I find it necessary to provide a compensating device.

Referring to Figures 8 and 9, the cam shaft 68 is shown carrying thereon a cam 165 which bears against a roller 166 fixed to a connecting rod 167. The rod 167 is pivoted at 168 to a rocker arm 169 which in turn surrounds a short shaft 170 keyed within a fixed bracket 171 which is a portion of the main frame. The bracket supports bearing 171'. The arm 167 has a lock nut adjustment 172 for varying the final position of the rocker arm 169 to vary the pressure on the breast of the tube.

An extension of the bracket 171 is dovetailed and forms a seat for the sliding carrier 173 which in turn supports the head 157 for supporting the jaws 144, 145. The two are attached by screws 157' which fit through holes 157² which are enlarged to permit adjustment initially between the carrier and head in any direction transversely to the tube axis by screws 173'. Normally, the sliding head 173 is drawn toward the fixed bracket 171 by the action of a pair of springs 174, one end of each of which is attached to a cross arm 175 mounted on the outer end of the fixed bracket. At their opposite ends the springs are fastened to pins 176 attached to the sliding head.

The rocker arm 169 carries a face cam 177 which bears against a companion cam 178 surrounding the shaft 170, which second cam is supported upon a sleeve 179. At the opposite end of the sleeve is located a head 180 fitting within a receptacle 181 formed in the sliding head 173.

Placed within the receptacle 181 between its rear wall 181' and the head 180 is a disc 182 of rubber or similar yielding material.

When the dies have almost reached their point of closure about the tube nipple, the cam 165 on cam shaft 58 raises the roller 166 and therewith connecting rod 167 causing the rocker arm 169 to raise and impart a partial rotary motion to the cam face 177.

This motion forces the sleeve with the cam face 178 and therewith the entire head to move slightly in a direction toward the tube, seating the dies firmly against the tube breast. The rubber disc 182 compensates for any slight differences in the length of the nipple or the thickness of the breast of the tube.

With the opening of the jaws 144 and 145 the bracket arm 169 drops, and the springs 174 draw the movable head 173 back toward the fixed bracket 171. The parts controlled by the movement of the cam 165 and those controlled by the cam 146 must be accurately timed so that the operations register at all times, in order that the jaws 144 and 145 within the head 157 seat upon the tube breast and surround the nipple in the correction relation. Slight inaccuracies and final adjustments in these movements can be made by the adjusting nut 172 on the arm 167, and the nut 153 on the threaded plunger shaft 152.

The pivotal connection 151 between the plunger 147 and the upwardly extending adjustable member 152 allows for the slight horizontal movement of the head 173 when the rocker arm 169 is raised to impart this movement. This is further facilitated by the ball and socket connection at 154' between threaded shaft 152 and cross head 154.

Adjustable arms 185 are pivoted at 186 to a cross member 187 fixed to the frame or base 50 at their lower extremity, and at their upper ends are pivoted to a cross member 188 resting on top of the head 157. This arrangement is provided for the purpose of stiffening the various parts associated with the threading of the nipples, and prevents any upward movement of the dies at that time.

In order to limit the travel of the jaws 144 and 145 toward one another, I provide a pair of adjustable depending tapered (wedge) stops 189, 190, which stops are carried upon the top of the head by threaded studs 191, 192. The stops are in the form of angles of which the horizontal flanges surround the threaded studs.

The stops are held in place by jamb nuts threaded upon the studs above and below the horizontal flanges. The vertical flanges of the stops extend downward, and the lower end of each has a beveled face, corresponding to a bevel on the face of the corresponding split jaw.

As the jaws are moved toward one another under the action of the T heads, their beveled faces engage with the bevels on the ends of the vertical flanges of the stops, limiting their travel toward one another. This position of the stop can be moved independently and to very minute differences of position giving not only an adjustment as little as one-thousandths of an inch difference of jaw position but a centering of the jaws to about the same degree of accuracy. This affords a fine adjustment supplemental to the adjustment by screws 173'. The fine adjustment also permits exact alignment of the threads in the two jaws.

Upon completion of the extrusion of the thread, the shaft 127 and with the rubber, gutta percha or other resilient or elastic material 139 are withdrawn, the dies are separated, the Geneva motion again moves, and the dial head is rotated, moving the spindle carrying the tube with its nipple, now threaded, to the next adjoining station, or to station "C"—Figure 3.

At station C the metal which closes the end of the nipple is removed. A description of this operation follows.

The metal portion at the end of the tube as initially extruded on the press, and including a thin metal closure, is preferably left until the threading has been completed in order that the stiffening of this material may additionally support the nipple during the formation of the thread.

I have found it advisable, in severing the metal closure, to use a rotating cutting tool, and to rotate it at a very high speed. For this reason I employ a separate motor 195 to furnish the necessary power at the high speed for this operation. (See Figures 1, 2 and 15). This motor runs continuously and drives a shaft 196 through the medium of a belt 197. At the end of the shaft 196 opposite the drive I mount a cutting tool 198, which is shaped so as to remove the closure at the end of the nipple, at the same time beveling the face surrounding the opening. (See Figure 17).

To prevent the turning of the tube upon the mandrel 125 I employ a thrust plate 199 (Figure 16) carried upon a reciprocating head 200 and engaging the breast of the tube. The movement of the head is imparted by the grooved cam 116 before referred to, being the same cam which furnishes motion for the feeding of the tubes from the hopper 107 to the mandrels 125 on the dial 65. (See Figures 14, 15, 16 and 17.)

The base of the reciprocating head 200 is dovetailed as at 201 and rides within a corresponding dovetailed groove 202 formed within a supporting frame which is part of the main frame 50. A depending arm 203, integral with the reciprocating head, carries upon its lower end a roller 204 which fits within the spiral groove of cam 116. As the cam rotates reciprocating motion is imparted to the head through this connection.

The thrust plate 199 is located in the circular path of bodily travel of the tube-carrying mandrels 125. Near the middle of the plate there is a beveled seat 205 terminating in an opening 205' through which the tube nipple projects. The seat lies at the bottom of a counterbore 206. The angle of the bevel of the seat is the same as the angle of the breast of the tube and when pressed against the tube the beveled surface holds the tube against rotary movement upon the supporting mandrel. The nipple extends far enough through the opening 205 to be fully accessible for the facing operation.

The plate 199 is resiliently supported and guided to have movement in a direction above the axis of the tube whose nipple is being faced and engages the breast of the tube in advance of the cutting tool 198. A plurality of supporting shafts 207 upon the movable head 200 carry the plate, which is normally pressed toward the tube mandrels by a plurality of springs 208. One spring surrounds each supporting shaft 207 and tends to press the plate 199 toward the tube. The supporting shafts slide within openings 209 in the head and reduced shaft ends 210 results in the formation of shaft shoulders against which the springs 208 rest. The opposite ends of the springs rest against the shoulders 211 at the inner ends of the openings.

When not engaged with a tube (when the reciprocating head is withdrawn) the travel of the thrust plate 199 is limited by shoulders 211 and stops 212 which are fastened to the reduced portions 210 of shafts 207 and engage with the back portions of the extension carrying the supporting shafts.

This construction permits the thrust plate to be carried forward toward the tube in advance of the cutter, to engage the breast of the tube and to grip it firmly before the cutter comes in contact with the tube nipple, yielding against the pressure of the springs to permit the tool to cut the remaining face portion from the discharge opening.

When the trimming of the nipple is complete the dial head 65 is turned to the next adjoining station, marked "D" on Figure 3, at which position the caps are applied to the opened nipples. These caps, indicated at 215, are made upon separate machines and are placed in a suitable hopper (not shown) carried above the cap feeding mechanism and are fed by gravity to the threading point through a chute or guideway 216.

The hopper and guideway 216 are carried by a reciprocating head 217, which is advanced and retracted in much the same way as is the nipple trimming mechanism at station "C" just previously described, and the reciprocation is controlled by the same spirally grooved cam 116.

Located at one end of the machine and mounted upon suitable supports is a short rock shaft 218 which carries at one end a rocker arm 219. This arm is bifurcated at its outer (free) end to receive one end of an adjustable link 220 the opposite end of which is connected to the movable dovetailed portion 201 of the reciprocating head 200. The rocker arm 219 also carries one end of the link 122 whose opposite end is fastened to the lower part of arm 118 by which the plunger 120 is moved to feed the tubes upon the mandrels 125 at station "A". A second rocker arm 221 is mounted on the shaft 218 at the end opposite the rocker arm 219, and its outer free end is connected with an adjustable link 222. The opposite free end of the link 222 is pivoted to a dovetailed portion 223 of the reciprocating head 217.

Motion imparted to the head 200 is carried to the rock shaft 218 by the link connection 220 causing the shaft to oscillate, and in turn causing the rocker arm 221 to rock back and forth and through its link connection at 222 imparts a similar motion to the reciprocating head 217.

The dovetailed portion 223 slides back and forth in a dovetailed groove 224 formed within a casting bolted to the main frame 50. The travel of the head 217, which is an integral part with the dovetailed portion 223, can be adjusted by the adjustable link 222.

Arranged at the end of the head, adjacent the free end of the mandrel 125 at this station (D), is a plate 225 to which is fastened the guideway 216. The guideway in turn carries the hopper (not shown) at its upper end. The plate 225 pivotally supports a series of spring controlled plates 226 radiating about a central axis, which is the center line of a hollow shaft 227. At the end of shaft 227 opposite the plate 225 and fixed to the shaft is pulley 92. Through the connections hereinbefore described under the heading "Power distribution," this pulley continuously rotates the hollow shaft 227. At the end of the shaft 227 adjacent the plate 225 I mount a capping socket 228 (shown clearly in sectional perspective in Figure 22), which turns with the hollow shaft. Within the center of the capping socket 228 is a plunger 229, spring pressed in one direction by the action of a spring 230 and limited in its travel by a pin and slot connection 231.

A yoke 232 is pivotally supported in advance of the plates 226 from a shaft 233 carried in brackets 234. A finger projection 235 extends from the rear of the yoke, i. e., from between its supporting shaft 233 and the plate 225. The yoke is so arranged and positioned as to span the nipple of a tube which is mounted upon a mandrel 125 and, when the head 217 is advanced, the yoke engages the breast of the tube at each side of the nipple and places just sufficient pressure upon the tube and mandrel to prevent them from turning during the application of the cap 215 upon the nipple.

Referring now to Figures 19 and 20, Figure 19 illustrates the several parts in a position showing the advancing head about to place a cap 215 in contact with the nipple of a tube upon a mandrel 125, and Figure 20 illustrates the same parts as shown in Figure 19 as positioned after the cap has been screwed upon the nipple of a tube. The caps are fed from the hopper down through the chute 216 by gravity, and the open end of the cap is always presented facing the nipple of the tube upon the mandrel in front of it. This is secured by a selecting device within the hopper and the lowermost cap comes to rest with its side upon the upper face of the spring controlled plate 226 which occupies a position in vertical line with the chute, and with its enlarged top portion in back of all of the spring plates 226, and in horizontal alignment with the capping socket 228. The next to the lowest cap 215 within the chute 216 is so positioned as to receive the finger projection 235 of the yoke 232 within its threaded opening. The projection fits loosely within the opening and acts to raise all of the caps within the chute at the time the lowermost cap is fed out from the capping mechanism, and to keep them raised until it is desired to position another cap for a succeeding operation. The projection 235 being integral with the yoke 232 is operated by the yoke through the latter's engagement with the tube upon the mandrel.

When the head 217 is entirely withdrawn, the weight of the caps within the chute 215 will overbalance the yoke and will ride past the finger projection 235 and the lower cap will find its seat upon the spring plate 226 as before explained. As the head 217 starts its movement toward a mandrel the yoke 232 engages the breast of the tube and the finger projection in engagement with the cap immediately above starts raising it and therewith raising the remaining caps within the chute to a position clearly illustrated in Figure 20.

The lowermost cap now held within the spring plates 226 is next engaged by the capping socket 228 (which is continuously rotated). Since the shape of the socket corresponds to the shape of the top of the cap, the socket moves over the top of the cap. The central spring pressed plunger 229 exerts sufficient pressure and at the same time yields sufficiently for the cap to find its thread upon the nipple, and for the capping chuck or socket to then complete the threading operation by the forward travel of the head 217. It will be understood that this engagement is very rapid and that there is no pause in the forward travel of the head 217. The exact distance of this travel controls the distance the cap is threaded upon the nipple, and the total distance is controlled by the adjustable link 222 at the drive end of the head.

When the head has reached the end of its stroke, and the cap has been threaded upon the nipple, the head starts its movement in the opposite direction, the cap head leaving the socket of the capping device. Because the cap is tightly threaded on the tube nipple it remains there while the cap passes out through the spring-controlled plates 226. The cap remains during retraction of the head 217. The yoke 232 is so designed as to prevent the tube from being drawn off the mandrel 125 as the head 217 recedes and to create sufficient friction upon the tube to overcome the tension of the springs of the spring controlled plates 226, thereby permitting the displacement of the nipple from the head 217.

With the completion of the capping operation, the dial head 65 is again turned and the capped tube is brought to its fifth position or to the position marked "E" in Figure 3, at which position the body of the tube is subjected to a printing treatment.

*The printing or coating mechanism*

Referring now to Figures 1, 24, 25, 26, 31 and 32, a reservoir 236 is shown arranged between a pair of supporting frames 237. A shaft 238 passes through the frame 237 and carries thereon a cylindrical roller 239 midway between the frames 237. The shaft 238 further acts as a fulcrum for a pair of supporting arms 240 which in turn forms supports for two other rollers 241 and 242.

Ink, paint or like material, with which it is desired to either basically coat or to apply as printed characters, is carried within the reservoir 236 and is taken up first by the cylindrical roller 239. It is then transferred to the intermediate roller 241 and thence to the roller 242. This latter roller (in the case of coating) is made of a special composition similar in nature to that used to distribute printing ink to type prior to its impression or, when it is desired to apply printed characters, this roll would carry the "type" and have the ink distributed to it by a roller similar in character to the roller 242.

In order to simplify the illustration I have here shown the coating only, showing the roller 242 in direct contact with the side wall of a tube upon a mandrel 125.

The cylindrical roller 241 is carried upon a shaft 243, and the cylindrical roller 242 is carried upon a shaft 244. This latter shaft carries at one end a sprocket wheel 245 which is driven by a sprocket wheel 102 on the cam shaft 68 through the medium of a sprocket chain 101. Gears 246, 247 and 248 on shafts 244, 243 and 238 respectively synchronize the rollers. Rollers 241 and 242 both have relative adjustment (see Figures 24, 25, 31 and 32) by means of their respective bearing blocks 249 and 250 working within slots in the two side arms 240. Further and more minute adjustment of the roller 242 is made by adjusting the wedges 251 forward and back upon their supporting brackets 252 by means of the screws 253. These wedges raise and permit to lower, a pair of pins 254, the top face of each of which is engaged by a cam 255 and the cams are carried by a shaft and are supported in brackets 257 attached to the side arms 240. A handle 258 is attached to one end of the shaft 256 for a purpose hereinafter explained.

The two arms 240 fulcrum about the shaft 238 and the cams 255, carried thereby, are the point of rest of this entire roller structure, engaging with the tops of the pins 254. Any adjustment of the wedges 251 will cause the pins 254 to raise or permit them to lower, thereby resulting in movement of the arms 240, carrying therewith the rollers 241 and 242 and providing a minute adjustment between the roller 242 and the face of the tube upon a mandrel 125. The flat of the cam is a rest on the high part of the cam.

In order to prevent the distribution of ink or paint upon the mandrel proper, at a time when no tube is present thereon, I turn the cams 255 by handle 258, a movement of which latter in one direction will permit of a fractional lowering of the frames 240 to the position seen in Figure 32, and thereby allow just sufficient space between the roller 242 and the mandrel 125 to prevent contact and consequent inking or painting upon the mandrel itself. Movement of the handle in the opposite direction will return the roller 242 to the inking or painting position shown in Figure 31.

In order that the tubes to be coated or printed may be correctly positioned upon their mandrels, I employ a spring finger 260 (Figure 26) which presses axially upon the head of the cap 215 and keeps the breast of the tube firmly seated against the free end of the mandrel. Finger 260 ultimately supported from an adjustable arm 261 pivoted at 262 upon a fixed bracket 263. The arm is adjustable throughout a range indicated by the arc slot 264 and is set by a clamping screw 265. The arm carries a shaft 266. The more immediate support for finger 260 is a bracket 267 which is capable of adjustment both along and about shaft 266 and is fixed upon it by set screw 268.

Waste end trimming

The tubes as extruded from the extruding press are irregular in length, due to varying amounts of metal in the original slugs from which they are made and other causes inherent to the process, and also have an uneven end, both of which necessitate trimming in order that they may be of uniform length and may present a neat and uniform appearance.

I trim by a specially designed cutter 269 upon a shaft 266 and adjust the cutting edge longitudinally of the shaft so that it is positioned at the proper point for the length intended. The bracket 261 is adjusted so as to bring the cutter into engagement with the tube upon the mandrel with just sufficient pressure to cut off the end.

The detailed construction of the cutter is shown in Figure 27 and comprises a circular knife blade 270 rotatably carried upon a ball-bearing-supported housing 271. The housing carries a circular shell 272 spaced from the housing by an annular core of rubber or like material 273 which surrounds the ball bearing housing and causes a cylindrical portion 274 of the surface of the shell to be presented in peripheral alignment with the outer peripheral cutting edge 275 of the knife. When the knife edge is brought in contact with a tube to be trimmed, the edge proper cuts through the metal and the rubber within the shell permits the shell to slightly yield excentrically, due to the difference in diameters of the tube and the mandrel, the portion 274 remaining in contact with the edge of the tube just cut will smooth out any rough spots in the cutting, iron out any inward curvature of the tube end as cut and leave a finished appearance upon the cut end of the tube.

The frictional engagement of the roller 242 furnishes the rotating force for the tube and mandrel 125, and the tube and mandrel in turn furnish the motive force for the rotation of the cutter 269.

This completes the operations upon the tube at this point, and the head 65 is again turned in order to bring the mandrel with the capped and coated trimmed tube to the next station, or station "F", Figure 3. The waste tube end 276 which has been cut off still remains on the mandrel.

At station "F" there is no mechanical operation upon the tube, and this position is utilized for the removal of the completed tube, manually, from the mandrel. The tube is seized by the cap and slid off the mandrel, leaving the waste tube end upon the mandrel.

The dial head 65 now moves to the next and final station of the cycle station "G" Figure 3, at which point the waste tube end is removed from the mandrel 125.

Mounted upon the pulleys 93 and 94 is an endless belt 277 the outer face of which carries a series of cleats 278 spaced at intervals along its face. This belt is positioned in line with the mandrel 125 when it occupies the seventh position in its cycle and is so arranged that the cleats will engage with the mandrel.

Due to the continuous travel of the belt 277 through its driving connections hereinbefore described under "Power distribution", the severed waste ends of the tubes left on the mandrels at station "E" are slid off the mandrels by the cleats 278, and are carried away in a suitable chute (not shown) to be melted over and recast into billets from which slugs are cut for further tube extrusion.

The mandrel 125 now free of any tube, is moved to the next station, or station "A" to start another cycle of operation.

All of the operations described take place simultaneously, and we have here merely followed one tube through its successive operations for purposes of description.

In the form shown in Figure 33 a different mobile molding material is used within the nipple to force the walls of the nipple outwardly into the threads of the jaws 144 and 145. Instead of using gutta percha, rubber or other like mobile solid material, provision is made for injecting water or other fluid within the nipple. This fluid would ordinarily be water or air for the reason only that it is not then necessary to save the fluid. In Figure 33 the fluid is intended to be discharged or used to compress air in advance of the fluid and is forced under pressure through the passage 279 in shaft 127'. The shaft is terminated at 280 in a reduced annular seat for packing 281 which may, if desired, be pressure-packed into contact with the inner wall 282 of the bore of the sleeve 126 by allowing the pressure fluid, or air in advance of the pressure fluid, to pass outwardly through apertures 283.

In Figure 33a the form is substantially the same as in Figure 33 except that a bag 284 is secured to the end of shaft 127² as by flange 285 on a tube 286 which is drawn back into sleeve 126 by nut 287. The bag 284 is clamped between flange 285 and shoulder 288. Water or oil for example may be injected and withdrawn into and from the bag, forcing the walls of the bag out into contact with the inner walls of the nipple.

These illustrations of Figures 33 and 33a are included for the purpose chiefly of showing the breadth of the invention and the fact that it does not depend upon the use of a mobile solid, whether resilient or elastic or otherwise, but is broader than this and applies with the use of any mobile agency capable of being outwardly pressed against the inner walls of the nipple.

Operation

In the operation of the machine, the operator is seated in front, i. e. facing the machine as it is illustrated in Figure 1, and in line with the tube carrying mandrels. This position is selected for convenience in removing the completed tubes from the machine, as the feeding thereto and all the remaining operations connected therewith are fully automatic.

The extruded tubes to be treated, are carried to the machine upon the endless belt 75, and are cammed into the hopper 107 from whence they are fed to the mandrels 125 as they are successively presented in line with the bottom of the hopper or the feeding position of the tubes.

The plunger 120 is moved toward a mandrel 125 engaging with the nipple end of the lowermost tube in its travel and moving the tube (open end first) upon the mandrel. The plunger then is withdrawn beyond the bottom of the hopper 107 and another tube drops to the bottom of the hopper for a succeeding loading operation.

The first mandrel, which we are following through a cycle is loaded at position "A" Figure 3. It is now moved one station, or to station "B" which is the threading position; the movement of the mandrel coinciding with the movement of the dial head 65 under control of the Geneva motion 63.

At station "B" the die jaws 144, 145 are brought to a position surrounding the nipple of the tube, and the toggle motion 71 is brought into play to operate the shaft 127 to force the mobile tubing 139 outward and thereby force the metal forming the walls of the nipple outward and into the contours of the threads within the die jaws 144, 145. As soon as the metal has been forced into its thread formation, the shaft 127 and the forming head are withdrawn, with the opening of the toggle 71, and the jaws 144 and 145 are again opened to release the now threaded nipple. The mandrel is then advanced to the next adjacent position or station "C", at which point the end of the nipple is opened and the face is finished off.

As the tube-carrying mandrel is brought to rest in registry with the facing mechanism, the reciprocating head 200 is advanced toward the tube and the opening in the trust plate 199 contacts with the breast of the tube and holds it tightly to the mandrel, preventing any rotation of the tube and mandrel upon its shaft 127.

The opening in the thrust plate permits the passage of the tube nipple therethrough and allows access of the rotating cutting knife to the excess metal which, until this time has formed a closure at the end of the nipple.

The reciprocating head continues to advance the rotating cutter until it bites into the metal end of the nipple severing sufficient metal to form an opening in the nipple, and finally beveling the outer periphery of the nipple. Figure 17 illustrates this operation clearly, the original outline of the tube nipple being indicated in dot-and-dash line and the finished cut being shown in section with the cutting tool in its relative cutting position.

The advance of the reciprocating head 200 is adjusted through link 220 so as to advance the cutter just sufficient distance to make the cut as illustrated in Figure 17. It then begins the reversal of its travel, and withdraws the cutting tool, releases the pressure of the thrust plate from the breast of the tube, and finally moves the entire cutting head out of the path of travel of the mandrels to permit movement of the treated tube forward to the next station "D", and to bring the succeeding tube into proper alignment for a repetition of the operation just described.

At station "D", the capping mechanism places the caps upon the opened nipple ends of the tubes, permitting them to be fed from a chute connected with a hopper source of supply and automatically controlling the cap feed by the reciprocation of the capping mechanism itself. The best illustrations of this part of the machine are shown in Figures 18 and 23 inclusive.

The reciprocating head 217, advanced and withdrawn by the same mechanism which advances and withdraws the nipple-opening mechanism just described, is now advanced toward the tube mounted upon the mandrel aligned therewith. The yoke 232 engages the breast of the tube and the finger 235 enters the hollow part of the cap which lies next to the bottom cap. The continued advance of the head 217 causes the yoke 232 to swing back toward the head and the finger 235 to move upwardly and to raise therewith, within the chute 216, the cap with which it is engaging and all of the remaining caps resting thereon. This leaves the lowermost cap only free to be acted upon by the rotary mechanism.

This cap is held by the spring-controlled plates 226, its flanged head lying between the plates and the body of the head 217 and the extended internally threaded portion extending outwardly between the plates 226 and directed toward the nipple of the tube.

The continuously rotated capping socket 228 has been advanced by this time a sufficient distance to embrace the flanged head of the cap and to impart rotary motion thereto.

The continued forward movement of the head 217 feeds the rotating cap upon the nipple of the tube and threads it thereon until it is completely seated, the required pressure being furnished by the plunger 229 spring-pressed forward by the action of the spring 230.

The completion of the threading operation is timed and controlled by the forward movement of the head 217, and the minute adjustment of this stroke is taken care of by the adjustable link 222.

As the head starts upon its reverse stroke, the cap 215, now fast upon the tube nipple, is followed by the plunger 229 (due to the action of the spring 230) until its motion is stopped by the pin and slot connection 231, and the flanged portion of the cap, during its withdrawal engages the spring pressed plates 226, forcing them to open against the action of their springs a sufficient distance to permit the cap to pass through them.

As the head 217 continues to move away from the mandrel 125, the yoke 232 is left free to swing, and the weight of the supply of caps 215 within the chute 216, due to their engagement, with the finger 235 overcome the weight of the yoke, raising it and thereby forcing the finger 235 out of engagement with the lowermost cap within the chute, and permitting the lowermost cap to drop and seat itself upon the lower gate and between the side gates 226, and with the next to the bottom cap positioned to receive the finger 235 for the next succeeding operation.

The mandrel with the capped nipple, is now advanced one station, or to station "E" at which pause in the cycle the body of the tube is either ground-coated or otherwise printed, and the irregular and variant-length open ends of the tubes are cut from the bodies of the tubes.

The best illustrations showing this step of the operation can be had by referring to Figures 1, 24, 25, 26, 27, 31 and 32.

The distributing roll 242 is designed (in the present showing) to place an even "ground" coating of colored ink, paint or the like upon the outer face of the body of each tube and is constantly rotated by the sprocket 245 on one end of its shaft 244, driven from the sprocket 102 mounted upon the cam shaft 68, through the connecting chain 101.

A supply of coating material is carried in the reservoir 236 and is taken up upon the roller 239 and is transferred to the intermediate idler roll 241 and in turn is distributed upon the roller 242 for application direct to the body of the tube.

The path of travel of the mandrels is such as to bring each tube in contact with the surface of roller 242 as the tube is brought to pause at station "E" of the cycle, and as the roller 242 is continuously rotated, the tube will be rotated and coating material will be distributed so long as the tube occupies this position.

If, for any reason it is desired to prevent the distribution of the coating material upon the tube, the arms 240 supporting the rollers 239, 241 and 242 can be moved slightly by manipulating the handle 258 attached to shaft 256 to thereby operate the cams 255 to permit the arms to swing outwardly breaking the contact between roller 242 and the body of the tube, (see Figures 31 and 32).

Simultaneously with the coating of the body of the tube, the waste end is severed therefrom by the action of the trimming cutter 269. This cutter, shown in detail in Figure 27, is so constructed as to permit the knife edge 275 to penetrate the metal of the tube, cutting off the tube evenly and to proper length. The shell surface irons out any roughening of the cut edge and straightens the tube at the cut.

With the severing of the waste end, the operation upon the tube at this station is complete, and the Geneva motion 63 again advances the dial head 65 and mandrel 125, bringing the tube to the next adjacent pause, or station "F" of the cycle.

At station "F" no mechanical operation is present, this pause being conveniently utilized for the purpose of removing the finished tube, which is a manual operation. The operator sitting in front of the machine takes hold of the cap screwed upon the tube, and slides it off the mandrel, leaving the mandrel free except for the waste trimming which was severed at the immediately preceding station.

The head now moves the mandrel to the next and final station of the cycle—designated as "G" Figure 3, and it is here that the waste trimmings are stripped from the mandrel. The best illustration of this mechanism is to be seen in Figures 1, 28 and 29 wherein I show an endless flat belt 270 in turn supported from a supporting rod 100.

The endless belt 277 is continuously driven by the belt 90 from the driving pulley 91 mounted on shaft 28, and has spaced at intervals throughout its length cleats 278. These cleats are so positioned with respect to the mandrel as to engage therewith to remove the excess waste cutting left after the trimming operation, and to carry it off the mandrel, where it may be chuted or conveyed to any convenient receptacle.

The empty mandrel is next moved to station "A" for a repetition of the cycle.

It will be understood that the operation at the several stations or pauses are all taking place simultaneously and that six tubes are being operated upon, either mechanically or manually, at one and the same time the seventh station being used for the striking the waste end.

It will be further understood that all of the operations upon the tubes take place entirely during the pauses between movements of the dial head, and that the mechanisms pertaining to these operations are at rest during the time periods in which the dial head is in motion.

While I have herein shown a single size of the tube, I can, with slight change, vary the machine to accommodate tubes of different capacities. The changes are determined by the positioning of the trimming knife, by interchanging the sizes of the nipples by interchanging the dies for others of variant size to correspond to the respective mandrel sleeves and by varying the sizes of the die jaws as desired.

It will be evident that the larger diameter of the ironer 272 than that of the cutter 270 causes the ironer to slip relatively with respect to the outer surface of the tube which it is ironing, with a result that there is a slight burnishing effect due to the dragging of the ironer against the surface of the tube adjacent the cut edge. The burnishing effect of the dragging action of the ironer improves the finish of the outer surface of the tube engaged at the same time that the presser face effect straightens the tube where there has been a tendency to inturn the tube through the action of the cutter.

It will be evident that the means by which the tubes are made independently rotatably upon their spindles are not material except in so far as they cooperate with that coating operation which is shown; and that even the fact of capacity for rotation in the tubes is not needed for the threading operation, the nipple facing operation, the capping operation (notwithstanding that the caps could be held stationary and the tube revolved if desired), the removal of the tubes and removal of the waste ends. In other words the rotatability is not needed, nor is advantage of it taken in the invention as illustrated, except at the station at which the coating and waste end cutting take place.

It will be evident that the detail of my thread forming mechanism is not material to the mechanism which follows nor to the steps which follow the threading station; that the detail of the nipple facing operation shown is not material to the operation at the stations which follow; that the same may be said of the capping, coating and end trimming operations; that generally the successive steps and the operations at the successive stations cooperate in a broad way, rather than in the details of their operations, with the other steps and mechanisms illustrated and described.

In addition to the novel steps and mechanism illustrated in conjunction with individual station stops of the tube in its travel about its path of revolution, novel sequences are claimed in the threading before the nipple trimming operation, and in the concurrent operation of coating and open end trimming between the capping and the tube removal.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim to be new and desire to secure Letters Patent is:

1. In a machine for treating collapsible tubes, a rotatable head, tube carriers thereon each comprising a sleeve having a bore of two different diameters having a shoulder at the juncture of the two bores, a mandrel surrounding a sleeve and rotatable thereon, a plunger axially movable through the center of the sleeve and having a reduced portion sliding in the reduced bore of the sleeve with a shoulder at the beginning of the reduced portion presented toward the shoulder of the sleeve and a spring within the sleeve, surrounding the reduced portion of the plunger and having opposite ends resting against the two shoulders.

2. In a machine for treating collapsible tubes, a rotatable head, a tube carrier thereon for presentation of a tube to tube treating operations of the machine at successive positions of the head, the carrier comprising a sleeve supported by the head, a mandrel surrounding the sleeve and rotatable thereon, a centrally disposed plunger, spring pressed in a direction away from the free end of the mandrel, threading mechanism operated by advancing the plunger, a second plunger in line with and engaging the first at one of the positions of the carrier, and a cam-operated toggle motion controlling the second plunger.

3. In a machine for treating collapsible tubes, a rotatable head, a tube carrier thereon for presentation of a tube to tube treating operations of the machine at successive positions of the head, the carrier comprising a sleeve supported by the head, a mandrel surrounding the sleeve and rotatable thereon, a centrally disposed plunger, spring pressed in a direction away from the free end of the mandrel, threading mechanism operated by advancing the plunger, a second plunger in line with and engaging the first at one of the positions of the carrier, a cam-operated toggle motion controlling the second plunger and an adjustment in the length of the first plunger.

4. In a machine for treating collapsible tubes, a rotatable head, a tube carrier thereon for presentation of a tube to tube treating operations of the machine at successive positions of the head, the carrier comprising a sleeve supported by the head, a mandrel surrounding the sleeve and rotatable on it, a centrally disposed plunger, spring pressed in a direction away from the free end of the mandrel, threading mechanism operated by advancing the plunger, a second plunger in line with and engaging the first at one of the positions of the carrier, a cam-operated toggle motion controlling the second plunger, and screw-adjusting means for increasing or decreasing the length of the first named plunger.

5. A step-by-step rotatable dial head for collapsible tube working, a plurality of mounts for collapsible tubes thereon at distances corresponding to the step-by-step operation and perpendicular to the dial, an internal nipple swelling mechanism carried by each mount and adapted to engage within and outwardly press the metal of the tube nipples in the successive tubes, a plunger within each of the mounts operating the mechanism, toggle means for moving the plungers one at a time in the successive mounts and a thread form surrounding the outsides of the nipples, one at a time during the threading operation.

6. A step-by-step rotatable dial head, a plurality of mounts for collapsible tubes thereon at distances corresponding to the step-by-step operation and perpendicular to the dial, an internal nipple swelling mechanism carried by each mount and adapted to engage within and outwardly press the metal of the tube nipples in the successive tubes, a plunger within each of the mounts operating the mechanism, toggle means for moving the plungers, one at a time in the successive mounts and a thread form surrounding the outsides of the nipples one at a time during the threading operation and axially holding the breast of the tube against the mount during the threading operation.

7. A step-by-step rotatable dial head for collapsible tube working, a plurality of mounts for collapsible tubes thereon at a distance corresponding to the step-by-step operation and perpendicular to the dial, an internal nipple swelling mechanism carried by each mount and adapted to engage within and outwardly press the metal of the tube nipples in the successive tubes, a plunger within each of the mounts operating the mechanism, toggle means for moving the plungers, one at a time in the successive mounts, a thread form surrounding the outsides of the nipples, one at a time during the threading operation and axially holding the breast of each tube against the mount during the threading operation and yielding means for accommodating differences in breast thickness whereby substantially the same pressure is available for the longitudinal holding of each of the tubes.

8. In a head for contouring the outer surfaces of the threads of nipples of collapsible tubes, a plurality of thread-carrying dies having surfaces adjoining the threads adapted to engage the breasts of the tubes when the dies have closed, means for moving the dies axially toward the tube while they are being closed and a buffer intermediate said means and the dies to adapt the dies to small variations in the extents of their forward movements to accommodate different thicknesses of tube breast.

9. In a head for contouring the outer surfaces of the threads of nipples of collapsible tubes, a plurality of thread-carrying dies having surfaces adjoining the threads adapted to engage the breasts of the tubes when the dies have closed, means for closing the dies about the tube nipples, other means for pressing the dies as closed axially toward the tube, and a buffer between the dies and said other means adapting the dies to small variations in the extents of their axial movements to accommodate different thicknesses of tube breast.

10. In a head for contouring the outer surfaces of the threads of nipples of collapsible tubes, a plurality of thread-carrying dies having surfaces adjoining the threads adapted to engage the breasts of the tubes when the dies have closed, means for closing the dies about the tube nipples and cam operated means including a buffer for resiliently pressing the dies axially toward the tube.

11. In a head for contouring the outer surfaces of the threads of nipples of collapsible tubes, a plurality of thread-carrying dies having surfaces adjoining the threads adapted to engage the breasts of the tubes when the dies have closed, means for closing the dies about the tube nipples, means for pressing the dies axially against the tube breasts, including a pair of circumferentially interfitting cams, means for turning one cam face about the other and a buffer in line of the cam pressure and adapted to compensate for differences in tube breast thicknesses.

12. A pair of die jaws having threaded internal surfaces adapted to outline the outer contour of the thread of a collapsible tube nipple, in combination with guides in a plane diagonal to the faces of the tube and diverging from each other in said plane as the distance increases and a support for said guides having universal movement for equalizing pressures and for compensation of the relative angular positions of the guides.

13. In a die operating mechanism for forming the contour of the outside of the nipple of a collapsible tube, a pair of die jaws, guides limiting the lateral movement of the jaws and forming spaces within which the jaws are adapted to move within the guide walls diagonally to each other and to the axis of the tube and cam means for giving the die jaws this movement.

14. In an outside threading mechanism against which a thread of a collapsible tube is to be expanded, a pair of die jaws, threads carried thereby, guides for the jaws having a direction diagonal to the axis of the tube and diagonal to each other and wedge means operating at right angles to the planes of movement of the jaws for moving the jaws together.

15. In an outside threading mechanism against which a thread of a collapsible tube is to be expanded, a pair of die jaws, threads carried thereby, guides for the jaws having a direction diagonal to the axis of the tube and diagonal to each other, wedge means operating at right angles to the planes of movement of the jaws for moving the jaws together, the wedge movements being equalized by a universal movement within their operating connections.

16. A pair of die jaws having threads on inner surfaces adapted to determine the contour of a thread on the outside of a collapsible tube nipple, a support for the collapsible tube and its nipple, guides for the jaws determining their movement diagonally toward and from each other, means for moving the jaws in both directions, mobile outwardly movable material within the nipple, means for pressing the mobile material outwardly and means for forcing the dies bodily in a direction generally axial of the tube to hold the breast of the tube between the dies and the support for the tube.

17. In a machine for swelling the nipples of collapsible tubes operatively into a threaded die, a support for the tube adapted to close, with the breast of the tube between the die and the support, a closed container adapted to enter within the interior of the nipple and to be outwardly swelled by fluid within the container and a tube connection for fluid under pressure and swelling the container.

18. In a machine for outwardly swelling a plain collapsible tube nipple into the thread of a die, a tube support adapted to engage the breast of the tube between the support and the die, leaving a space for fluid within the nipple, and tube and connections for introduction of fluid within the space to swell the nipple outwardly.

19. In a machine for outwardly swelling a plain collapsible tube nipple into the thread of a die, a tube support adapted to engage the breast of the tube between the support and the die, leaving a space for fluid within the nipple and tube connection for introduction of fluid within the space to swell the nipple outwardly and pressure-packed sealing means surrounding the tube to prevent leakage past the tube.

20. The method of freeing a die from the threads of a collapsible tube nipple and from the breast of the tube against which the die has pressed during the threading operation, which consists in drawing the parts of the die away from their threading position at an angle to the axis of the tube, between an angle perpendicular to the breast of the tube in the middle of the acting surface of the die and perpendicular to the axis of the tube at the same point.

EDWIN H. BARKER.